US012642719B2

(12) United States Patent
Emfinger et al.

(10) Patent No.: US 12,642,719 B2
(45) Date of Patent: Jun. 2, 2026

(54) FRONT ADD-ON FOR A WHEELCHAIR

(71) Applicant: PERMOBIL, INC., Lebanon, TN (US)

(72) Inventors: William Alexander Emfinger, Nashville, TN (US); Benjamin William Gasser, Nashville, TN (US); Benjamin Phillip Hemkens, Nashville, TN (US)

(73) Assignee: PERMOBIL, INC., Lebanon, TN (US)

( * ) Notice: Subject to any disclaimer, the term of this patent is extended or adjusted under 35 U.S.C. 154(b) by 1115 days.

(21) Appl. No.: 17/556,067

(22) Filed: Dec. 20, 2021

(65) Prior Publication Data

US 2023/0190546 A1 Jun. 22, 2023

(51) Int. Cl.

| | |
|---|---|
| ***A61G 5/02*** | (2006.01) |
| ***A61G 5/04*** | (2013.01) |
| ***A61G 5/10*** | (2006.01) |

(52) U.S. Cl.

CPC ............. *A61G 5/027* (2013.01); *A61G 5/045* (2013.01); *A61G 5/047* (2013.01); *A61G 5/1005* (2013.01)

(58) Field of Classification Search

CPC .......... A61G 5/04; A61G 5/047; A61G 5/027; A61G 5/1005; A61G 5/045; A61G 5/1051

USPC ......................................... 180/11, 15, 16, 13

See application file for complete search history.

(56) References Cited

U.S. PATENT DOCUMENTS

| | | | |
|---|---|---|---|
| 565,718 | A | 8/1896 | Boardman |
| 588,495 | A | 8/1897 | Smith |
| 1,794,796 | A | 3/1931 | Reichert et al. |
| 2,192,282 | A | 3/1940 | Warner |
| 2,448,992 | A | 9/1948 | Love et al. |
| 2,495,573 | A | 1/1950 | Duke |
| 2,548,274 | A | 4/1951 | Oeveren |
| 2,978,053 | A | 4/1961 | Schmidt |
| 3,794,132 | A | 2/1974 | Moon |
| 3,912,032 | A | 10/1975 | Benz et al. |
| 3,921,744 | A | 11/1975 | Benoit et al. |
| 4,475,613 | A | 10/1984 | Walker |
| 4,503,925 | A | 3/1985 | Palmer et al. |
| 4,592,563 | A | 6/1986 | Dean et al. |
| 4,759,418 | A | 7/1988 | Goldenfeld et al. |

(Continued)

FOREIGN PATENT DOCUMENTS

| | | | |
|---|---|---|---|
| DE | 202015103690 | U1 | 7/2015 |
| DE | 202023103150 | U1 | 6/2023 |

(Continued)

OTHER PUBLICATIONS

EP3053563, English translation (Year: 2016).*

(Continued)

*Primary Examiner* — Anne Marie M Boehler

(74) *Attorney, Agent, or Firm* — Michael Best & Friedrich LLP

(57) ABSTRACT

A steering system for a wheelchair includes a steering device configured to be engaged by a user, a front wheel operably connected to the steering device, and a frame assembly configured to carry the steering device and the front wheel. The frame assembly is configured to removably engage a mounting member of the wheelchair. A mounting assembly can be coupled to the frame assembly. The mounting assembly is configured to selectively couple to the mounting member of the wheelchair and selectively electrically connect to a motorized drive assembly coupled to the wheelchair.

37 Claims, 16 Drawing Sheets

(56) References Cited

U.S. PATENT DOCUMENTS

| | | | | |
|---|---|---|---|---|
| 5,135,063 | A | 8/1992 | Kropf | |
| 5,221,100 | A | 6/1993 | McNutt | |
| 5,501,480 | A * | 3/1996 | Ordelman | A61G 5/047 280/250 |
| 5,509,674 | A | 4/1996 | Browning | |
| 5,651,422 | A | 7/1997 | Casali | |
| 5,899,475 | A | 5/1999 | Verhaeg et al. | |
| 6,766,871 | B2 | 7/2004 | Sawyer | |
| 7,140,621 | B2 | 11/2006 | Cheng | |
| 7,216,728 | B2 | 5/2007 | Huang et al. | |
| 8,079,604 | B2 | 12/2011 | Newton | |
| 9,144,525 | B2 * | 9/2015 | Richter | A61G 5/1005 |
| 9,302,730 | B2 | 4/2016 | Takenaka et al. | |
| 9,326,901 | B2 | 5/2016 | Conte | |
| 9,603,764 | B2 | 3/2017 | Turturro et al. | |
| 9,872,805 | B2 | 1/2018 | Bach Castillo | |
| 9,987,546 | B1 | 6/2018 | Clos et al. | |
| 9,993,378 | B2 | 6/2018 | Turturro et al. | |
| 10,112,675 | B2 | 10/2018 | Takenaka et al. | |
| 10,130,531 | B1 | 11/2018 | Laconis | |
| 10,238,952 | B2 | 3/2019 | Clos et al. | |
| 10,543,866 | B2 | 1/2020 | Araki et al. | |
| 10,583,888 | B2 | 3/2020 | Araki et al. | |
| 11,576,830 | B2 | 2/2023 | Menig | |
| 11,642,256 | B2 | 5/2023 | Menig | |
| 12,115,110 | B2 * | 10/2024 | Traxinger | A61G 5/027 |
| 2005/0236194 | A1 | 10/2005 | Kidd et al. | |
| 2009/0066150 | A1 | 3/2009 | O'Rourke, Sr. | |
| 2011/0095508 | A1 | 4/2011 | Chiu | |
| 2011/0241301 | A1 | 10/2011 | Duvivier | |
| 2011/0308880 | A1 | 12/2011 | Chiu | |
| 2012/0080243 | A1 * | 4/2012 | Mulhern | A61G 5/047 180/11 |
| 2013/0008732 | A1 | 1/2013 | Richter | |
| 2013/0240271 | A1 * | 9/2013 | Tallino | A61G 5/1054 180/11 |
| 2014/0262575 | A1 | 9/2014 | Ritcher | |
| 2018/0147100 | A1 | 5/2018 | Conte | |
| 2019/0015272 | A1 | 1/2019 | Benedini | |
| 2019/0217915 | A1 | 7/2019 | Clos et al. | |
| 2020/0000657 | A1 | 1/2020 | Kim et al. | |
| 2020/0000658 | A1 | 1/2020 | Klein et al. | |
| 2020/0008990 | A1 | 1/2020 | Harrison | |
| 2020/0085651 | A1 | 3/2020 | Menig | |
| 2020/0085652 | A1 | 3/2020 | Menig | |
| 2023/0142113 | A1 | 5/2023 | Menig et al. | |
| 2023/0146019 | A1 | 5/2023 | Menig et al. | |
| 2023/0165740 | A1 | 6/2023 | Menig et al. | |
| 2023/0165741 | A1 | 6/2023 | Dziobek et al. | |
| 2023/0172779 | A1 | 6/2023 | Menig et al. | |
| 2023/0190547 | A1 * | 6/2023 | Emfinger | A61G 5/047 180/13 |
| 2023/0190548 | A1 * | 6/2023 | Emfinger | A61G 5/1005 180/13 |

FOREIGN PATENT DOCUMENTS

| | | | |
|---|---|---|---|
| DE | 202023103152 | U1 | 6/2023 |
| EP | 0625434 | A1 | 11/1994 |
| EP | 1927331 | A1 | 6/2008 |
| EP | 1911428 | B1 | 6/2011 |
| EP | 3053563 | A1 | 8/2016 |
| EP | 3173056 | A1 | 5/2017 |
| EP | 3058922 | B1 | 12/2017 |
| EP | 3415410 | A1 | 12/2018 |
| EP | 3434244 | A1 | 1/2019 |
| EP | 3501469 | A1 | 6/2019 |
| EP | 3622930 | A2 | 3/2020 |
| EP | 3622931 | B1 | 4/2021 |
| EP | 3501468 | B1 | 9/2021 |
| JP | 2001340391 | A | 12/2001 |
| JP | 2006167232 | A | 6/2006 |
| WO | 02085645 | A1 | 10/2002 |
| WO | 2017081475 | A1 | 5/2017 |
| WO | 2017199116 | A1 | 11/2017 |

OTHER PUBLICATIONS

International Search Report and Written Opinion for Application No. PCT/US2022/053350 dated Jul. 4, 2023 (19 pages).
International Search Report and Written Opinion for Application No. PCT/US2022/053352 dated Jul. 7, 2023 (19 pages).
International Search Report and Written Opinion for Application No. PCT/US2022/053355 dated Apr. 6, 2023 (13 pages).
Invitation to Pay Additional Fees for International Application No. PCT/US2022/053352 dated Apr. 18, 2023 (11 pages).
Invitation to Pay Additional Fees for International Application No. PCT/US2022/053350 dated Apr. 28, 2023 (10 pages).

* cited by examiner

FRONT ADD-ON FOR A WHEELCHAIR

FIELD OF THE DISCLOSURE

The present disclosure relates to an add-on for a manual wheelchair. More specifically, the present disclosure relates to a removable steering assembly for the wheelchair that is operable by a user at the front of the wheelchair, and that selectively couples to a rear axle of the wheelchair.

BACKGROUND

Add-on hand bikes for a wheelchair are generally known in the art. These devices are motorized hand bikes that attach to a front of the wheelchair. Generally, these devices include a handlebar, a front wheel, and a motor all positioned in the add-on. As such, all of these components are in front of the wheelchair user. Unfortunately, these add-on hand bikes have substantial limitations. They are very heavy, because the motorization system, along with the handlebar and front wheel, are all integrated into the add-on. Accordingly, it can be very difficult for certain wheelchair users to manipulate, attached, and/or detach the hand bike from the front of the wheelchair. Add-on hand bikes can also have complex systems for mounting (or attaching) the hand bike to the wheelchair. This can be cumbersome for a wheelchair user to attach and detach the hand bike to the wheelchair. Accordingly, there is a need for an add-on that easily attaches and detaches to a wheelchair, while also providing steering and throttle control for an associated drive system.

SUMMARY

In one embodiment, a steering system for a wheelchair includes a steering device configured to be engaged by a user, a front wheel operably connected to the steering device, and a frame assembly configured to carry the steering device and the front wheel. The frame assembly is configured to removably engage a mounting member of the wheelchair. A motorized drive assembly is configured to removably engage the wheelchair, the motorized drive assembly being positioned rearward of an axis of rotation of a pair of rear wheels of the wheelchair. The mounting member of the wheelchair can include a rear axle of the wheelchair. Alternatively, the mounting member of the wheelchair can be a member fastened to a wheelchair frame separate from the rear axle of the wheelchair.

In another embodiment, a method of selectively connecting a steering assembly to a wheelchair includes lifting a first end of a frame assembly, the first end of the frame assembly carrying a mounting assembly, a second end of the frame assembly, opposite the first end, carrying a steering member and a front wheel operably connected to the steering member, maintaining contact of the front wheel with a surface, and engaging the mounting assembly with a mounting member of the wheelchair while a motorized drive assembly is coupled to the wheelchair, the motorized drive assembly positioned rearward of an axis of rotation of a pair of rear wheels of the wheelchair. The mounting member of the wheelchair can include a rear axle of the wheelchair. Alternatively, the mounting member of the wheelchair can be a member fastened to a wheelchair frame separate from the rear axle of the wheelchair.

In another embodiment, a steering assembly for a wheelchair includes a steering member, a front wheel operably connected to the steering member, a frame assembly configured to carry the steering member and the front wheel, and a mounting assembly coupled to the frame assembly. The mounting assembly is configured to selectively couple to a rear axle of the wheelchair and selectively electrically connect to a motorized drive assembly removably coupled to the rear axle of the wheelchair.

In another embodiment, a removable steering system for a wheelchair includes a frame assembly defining a first end opposite a second end, a wheelchair mounting assembly coupled to the first end of the frame assembly, and a steering assembly including a steering member operably connected to a front wheel, the steering assembly coupled to the second end of the frame assembly. While the front wheel remains in contact with a surface, the frame assembly is configured to be moved between a first position, where the wheelchair mounting assembly engages a portion of the wheelchair to attach the steering system to the wheelchair, and a second position, where the wheelchair mounting assembly disengages the portion of the wheelchair to detach the steering system from the wheelchair. A motorized drive assembly is removably mounted to the wheelchair while the frame assembly is moved between the first and second positions.

Other aspects of the disclosure will become apparent by consideration of the detailed description and accompanying drawings.

Before embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways.

DETAILED DESCRIPTION

The present disclosure is directed to an embodiment of a steering assembly 100 that is configured to selectively attach (or selectively couple) to a wheelchair 10. The steering assembly 100 is configured to be positioned at a front of the wheelchair 10 for user operation. The steering assembly 100 selectively couples to a rear axle of the wheelchair 10, while also selectively electrically connects to a motorized drive attached to the wheelchair 10. Thus, the steering assembly 100 can be used to operate the motorized drive, while also allowing the user to steer the wheelchair 10. The steering assembly 100 can also be attached to or detached from the wheelchair 10 as needed by the user of the wheelchair 10.

Figure 1:
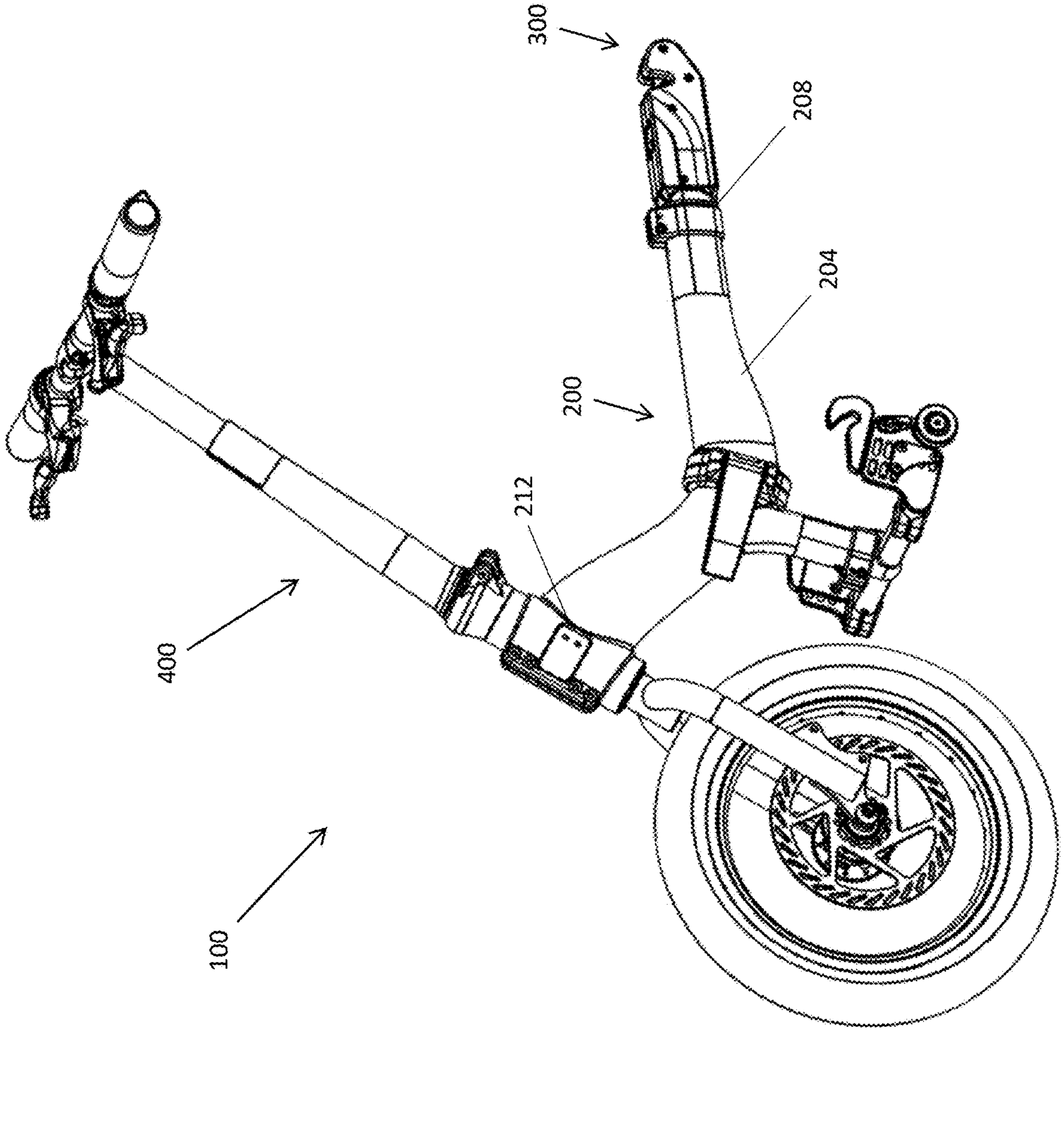
FIG. 1 is a perspective view of a steering assembly that is configured for selective attachment to a wheelchair.

With reference now to the figures, FIG. 1 illustrates an embodiment of a steering assembly 100. The steering assembly 100 (also referred to as a steering system 100 or a front add-on 100) includes a frame assembly 200, a mounting assembly 300, and a steering device 400. The frame assembly 200 includes an elongated frame member 204. The frame member 204 includes a first end 208 opposite a second end 212. The first end 208 is coupled to the mounting assembly 300. The second end is coupled to the steering device 400. The frame member 204 is substantially hollow from the first end 208 to the second end 212.

Figure 2:
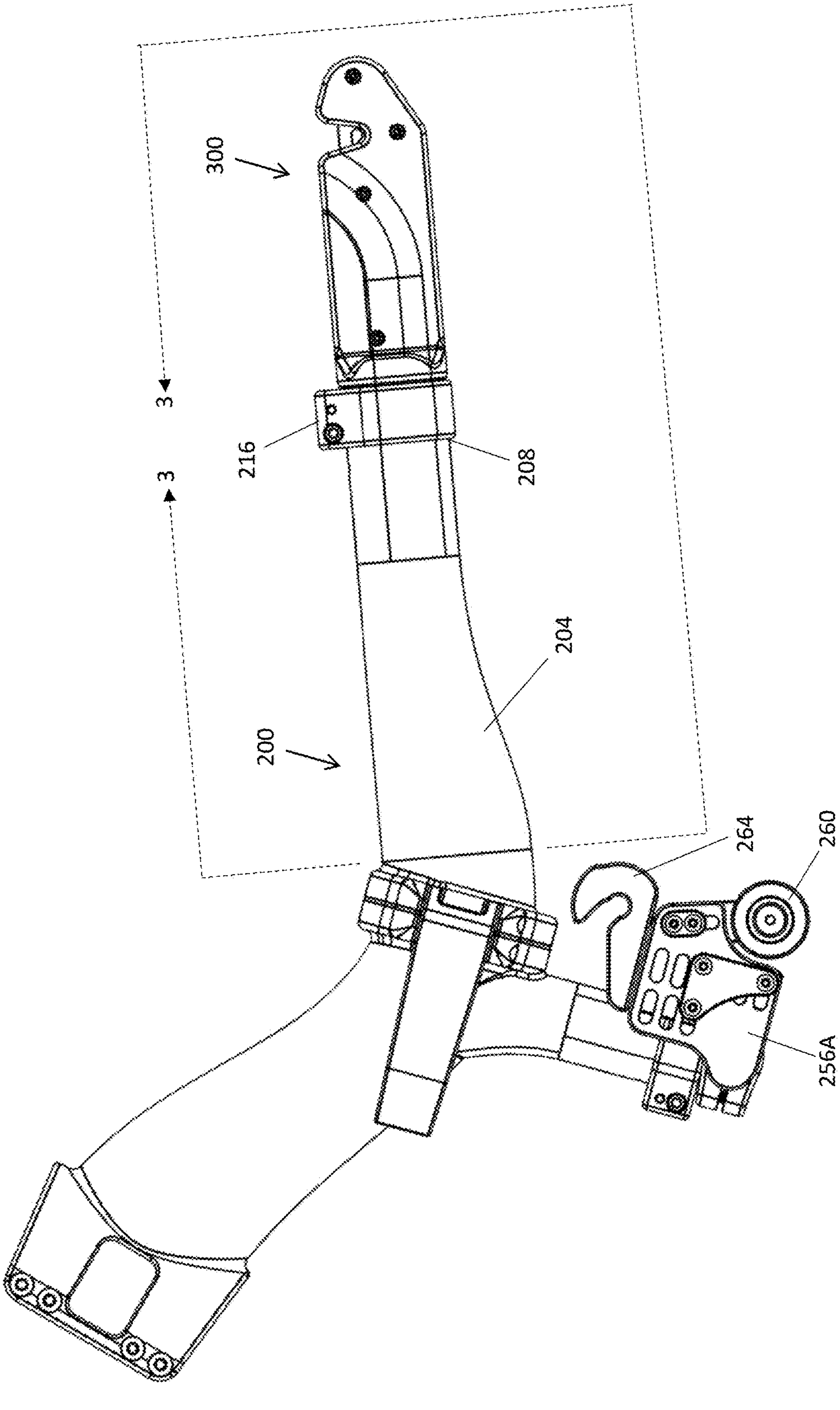
FIG. 2 is a side view of the steering assembly of FIG. 1, with the steering device removed.
Figure 3:
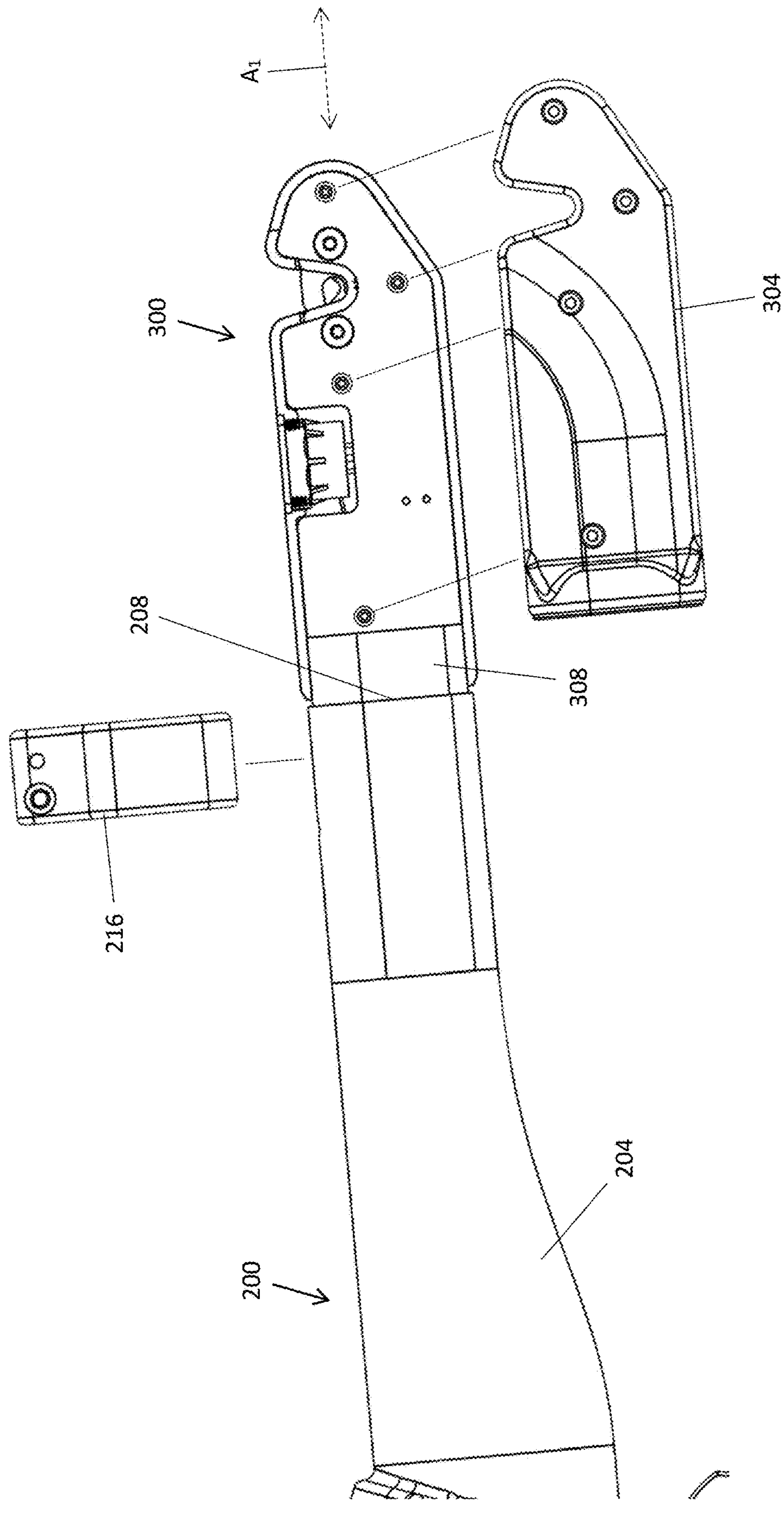
FIG. 3 is a partially exploded view of a portion of the steering assembly of FIG. 2, taken along line 3-3 of FIG. 2.

With reference to FIGS. 2-3, the mounting assembly 300 slidably engages the first end 208 of the frame member 204. A first removable locking member 216 (also referred to as a depth adjustment fastener 216), which is shown as a compression clamp 216, applies a compressive force on the frame member 204 to maintain the position of the mounting assembly 300 relative to the frame member 204. With specific reference to FIG. 3, which shows the first removable locking member 216 and a portion of an outer housing 304 of the mounting assembly 300 removed, the mounting assembly 300 includes a mounting member 308. The mounting member 308 is received by the first end 208 of the frame member 204. The mounting member 308 is configured to slide (or telescope) relative to the frame member 204 along a first axis $A_1$. The frame member 204 defines the first axis $A_1$. The mounting member 308 is configured to slide along the first axis $A_1$ to provide depth adjustment of the steering assembly 100 relative to the wheelchair 10. Once the mounting assembly 300 is slidably positioned (or repositioned) relative to the frame member 204 a desired distance along the first axis $A_1$, the first removable locking member 216 can engage the frame member 204. The first removable locking member 216 applies a compressive force on the frame member 204 and the mounting member 308, restricting sliding (or telescoping) movement between the members 204, 308. In other examples of embodiments, the mounting member 308 can be configured to receive a portion of the frame member 204, or the members 204, 308 can be coupled in any suitable manner to facilitate selective sliding or telescopic length adjustment along the first axis $A_1$. For example, the first removable locking member 216 that selectively connects (or selectively locks) members 204, 308 can be a button clip for selective engagement with a locking aperture, a telescoping lever clamp, a telescoping twist lock clamp, or any other device actuatable to lock the members to restrict length adjustment and unlock the members to allow length adjustment.

Figure 4:
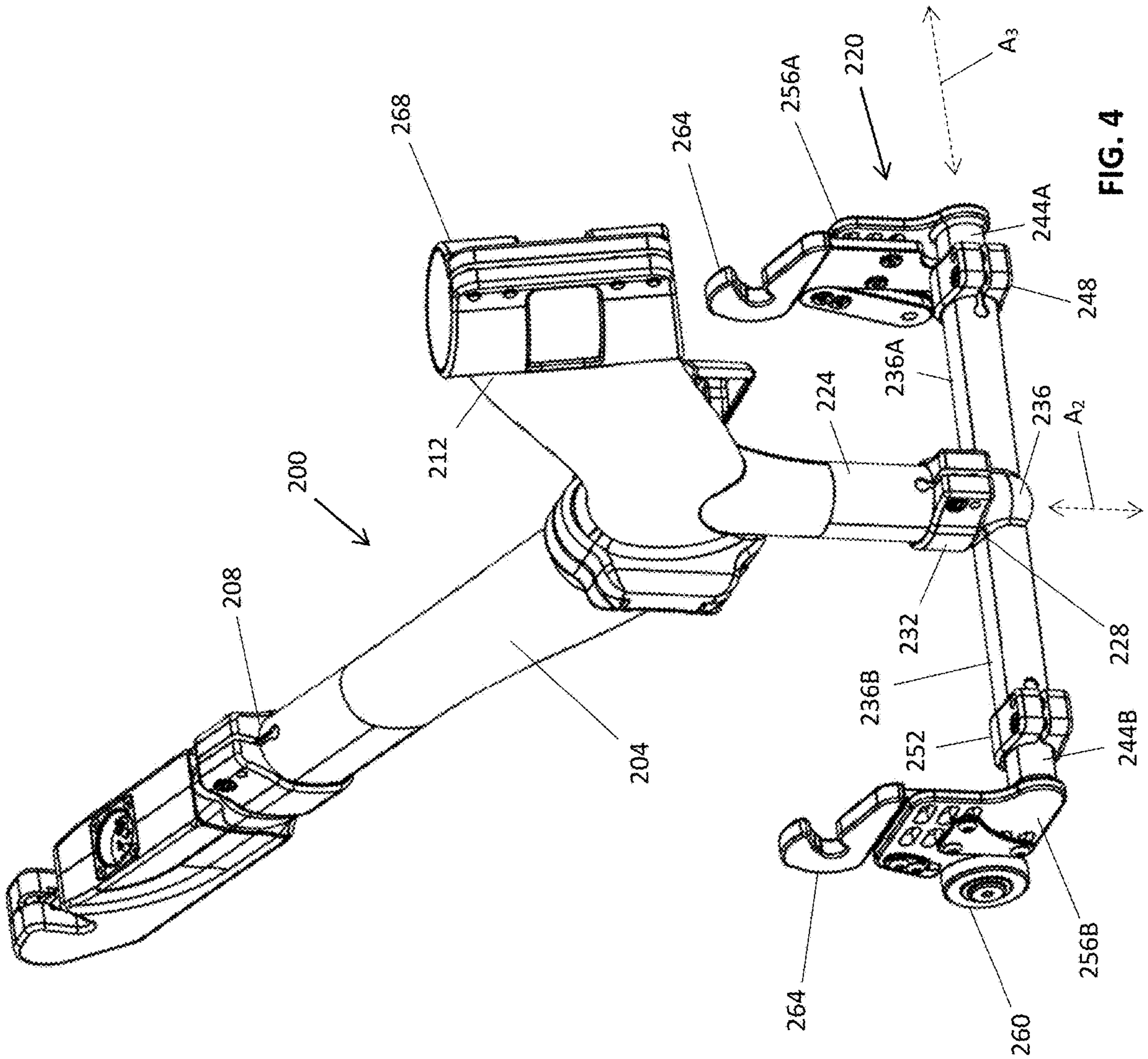
FIG. 4 is a perspective view of the steering assembly of FIG. 2, taken from the second end of the steering assembly.

With reference now to FIG. 4, the frame assembly 200 includes a lift assembly 220. More specifically, the lift assembly 220 is coupled to the frame member 204. The lift assembly 220 is also configured to selectively engage a portion of the wheelchair 10 (shown in FIG. 10). In addition, the lift assembly 220 provides the user adjustability in at least two directions to facilitate a customized user footrest on the steering assembly 100. The frame assembly 200 includes a lift support member 224 configured to engage the lift assembly 220. The lift support member 224 is coupled to the frame member 204 (or formed with the frame member 204). Like the frame member 204, the lift support member 224 is substantially hollow. The lift assembly 220 includes a first connection member 228. The first connection member 228 is coupled to the lift support member 224 of the frame member 204. More specifically, the first connection member 228 is partially received by the lift support member 224 and configured to slide (or telescope) relative to the lift support member 224 along a second axis $A_2$. The lift support member 224 defines the second axis $A_2$. The lift assembly 220 is configured to be slidably positioned (or repositioned) relative to the lift support member 224 (or relative to the frame member 204) a desired distance along the second axis $A_2$. This is to provide height adjustment of the lift assembly 220 relative to the frame member 204. A second removable locking member 232 (also referred to as a height adjustment fastener 232), which is shown as a compression clamp 232, applies a compressive force on the lift support member 224 to maintain a desired position of the lift assembly 220 relative to the frame member 204, and more specifically relative to the lift support member 224. In other examples of embodiments, the first connection member 228 can be configured to receive a portion of the frame member 204, and more specifically a portion of the lift support member 224. In other embodiments, the members 224, 228 can be coupled in any suitable manner to facilitate selective sliding or telescopic length adjustment along the second axis $A_2$, and subsequent selective locking of the members. For example, the height adjustment fastener 232 that selectively connects (or selectively locks) members 224, 228 can be a button clip for selective engagement with a locking aperture, a telescoping lever clamp, a telescoping twist lock clamp, or any other device actuatable to lock the members to restrict length adjustment and unlock the members to allow length adjustment.

The first connection member 228 is centrally positioned on the lift assembly 220. Two foot support members, a first foot support member 236A and a second foot support member 236B extend from a joint 240. The first connection member 228 also engages the joint 240. Accordingly, the first connection member 228 and the two foot support members 236A, B are each coupled to the joint 240. The foot support members 236A, B are positioned (or oriented) at an angle to the first connection member 228. More specifically, the foot support members 236A, B are substantially orthogonal (or perpendicular) to the first connection member 228. The foot support members 236A, B are also positioned on opposing sides of the joint 240. In other embodiments, the foot support members 236A, B can each be oriented at any suitable or desired angle to the first connection member 228.

The lift assembly 220 also includes a second member 244A and a third member 244B. The second member 244A is coupled to the first foot support member 236A, while the third member 244B is coupled to the second foot support member 236B. Each member 244A, B is configured to slide (or telescope) relative to the respective foot support member 236A, B. As illustrated, the second member 244A is partially received by the first foot support member 236A. The second member 244A is configured to slide (or telescope) relative to the first foot support member 236A along a third axis $A_3$. Similarly, the third member 244B is partially received by the second foot support member 236B. The third member 244B is configured to slide (or telescope) relative to the second foot support member 236B along the third axis $A_3$. The third axis $A_3$ is defined by the second member 244A and the third member 244B. In addition, the third axis $A_3$ is defined by the first and second foot support members 236A, B. The third axis $A_3$ is approximately perpendicular (or orthogonal) to the second axis $A_2$. The members 244A, B slide relative to the respective foot support members 236A, B to provide width adjustment of a foot plate (or foot support) of the lift assembly 220. A third removable compression member 248 (also referred to as a first width adjustment fastener 248), which is shown as a compression clamp 248, selectively applies a compressive force on the first foot support member 236A to maintain a desired position of the second member 244A relative to the first foot support member 236A. A fourth removable compression member 252 (also referred to as a second width adjustment fastener 252), which is shown as a compression clamp 252, selectively applies a compressive force on the second foot support member 236B to maintain a desired position of the third member 244B relative to the second foot support member 236B. In other examples of embodiments, the second member 244A can be configured to receive a portion of the first foot support member 236A. The third member 244B can also be configured to receive a portion of the second foot support member 236B. In other examples of embodiments, the second member 244A and the first foot support member 236A, along with the third member 244B and the second foot support member 236B, can be coupled in any suitable manner to facilitate selective sliding or telescopic length adjustment along the third axis $A_3$, and subsequent selective locking of the members. For example, the first width adjustment fastener 248, which selectively connects (or selectively locks) members 244A, 236A, and the second width adjustment fastener 252, which selectively connects (or selectively locks) members 244B, 236B, can be a button clip for selective engagement with a locking aperture, a telescoping lever clamp, a telescoping twist lock clamp, or any other device actuatable to lock the members to restrict length adjustment and unlock the members to allow length adjustment.

A mounting plate 256A is coupled to an end of the second member 244A, opposite the end coupled to the first foot support member 236A. Similarly, a mounting plate 256B is coupled to an end of the third member 244B, opposite the end coupled to the second foot support member 236B. The mounting plates 256A, B are generally identical, and mirror images of each other. Each mounting plate 256A, B includes a roller 260 (see FIGS. 2 and 4) and a hook 264. Thus, the lift assembly 220 includes a plurality of rollers 260 and a plurality of hooks 264. The rollers 260 are configured to contact a surface upon which the wheelchair 10 is positioned (e.g., ground, flooring, etc.) to balance the steering assembly 100 prior to engagement with the wheelchair 10 by the user, or after disengagement with the wheelchair 10 by the user. In response to the steering assembly 100 being engaged with the wheelchair 10, the rollers 260 are lifted, and not in engagement with the surface. The hooks 264 are each configured to engage a portion of the wheelchair 10 in response to the steering assembly 100 being engaged with the wheelchair 10. For example, the hooks 264 can each engage a mounting member positioned on a portion of the wheelchair support tubing (or a wheelchair frame), such as a seat tube, of a support tube associated with the wheelchair caster wheels.

The lift assembly 220 provides adjustability in at least two directions to facilitate a customized user footrest on the steering assembly 100 for the user. The lift assembly 220 can be adjusted in a first direction along the second axis $A_2$ to provide height adjustment relative to the frame member 204. The height adjustment fastener 232 can be disengaged, allowing the first connection member 228 to slide (or telescope) relative to the lift support member 224 along the second axis $A_2$. When desired height of the lift assembly 220 is achieved, the height adjustment fastener 232 can be engaged (or reengaged) to lock the position of the first connection member 228 relative to the lift support member 224.

The lift assembly 220 can also be adjusted in a second direction along the third axis $A_3$ to provide width adjustment of the assembly 220. The first width adjustment fastener 248 can be disengaged, allowing the second member 244A to slide (or telescope) relative to the first foot support member 236A along the third axis $A_3$. Similarly, the second width adjustment fastener 252 can be disengaged, allowing the third member 244B to slide (or telescope) relative to the second foot support member 236B along the third axis $A_3$. It should be appreciated that the second member 244A is configured to slide towards and away from the third member 244B, while the third member 244B is configured to slide towards and away from the second member 244A along the third axis $A_3$. When a desired position of the second member 244A, relative to the first foot support member 236A is achieved and/or a desired position of the third member 244B, relative to the second foot support member 236B is achieved, the respective width adjustment fasteners 248, 252 can be engaged (or reengaged) to lock the position of the member 244A, B relative to the associated foot support member 236A, B to achieve a targeted or desired width of the lift assembly 220.

Figure 5:
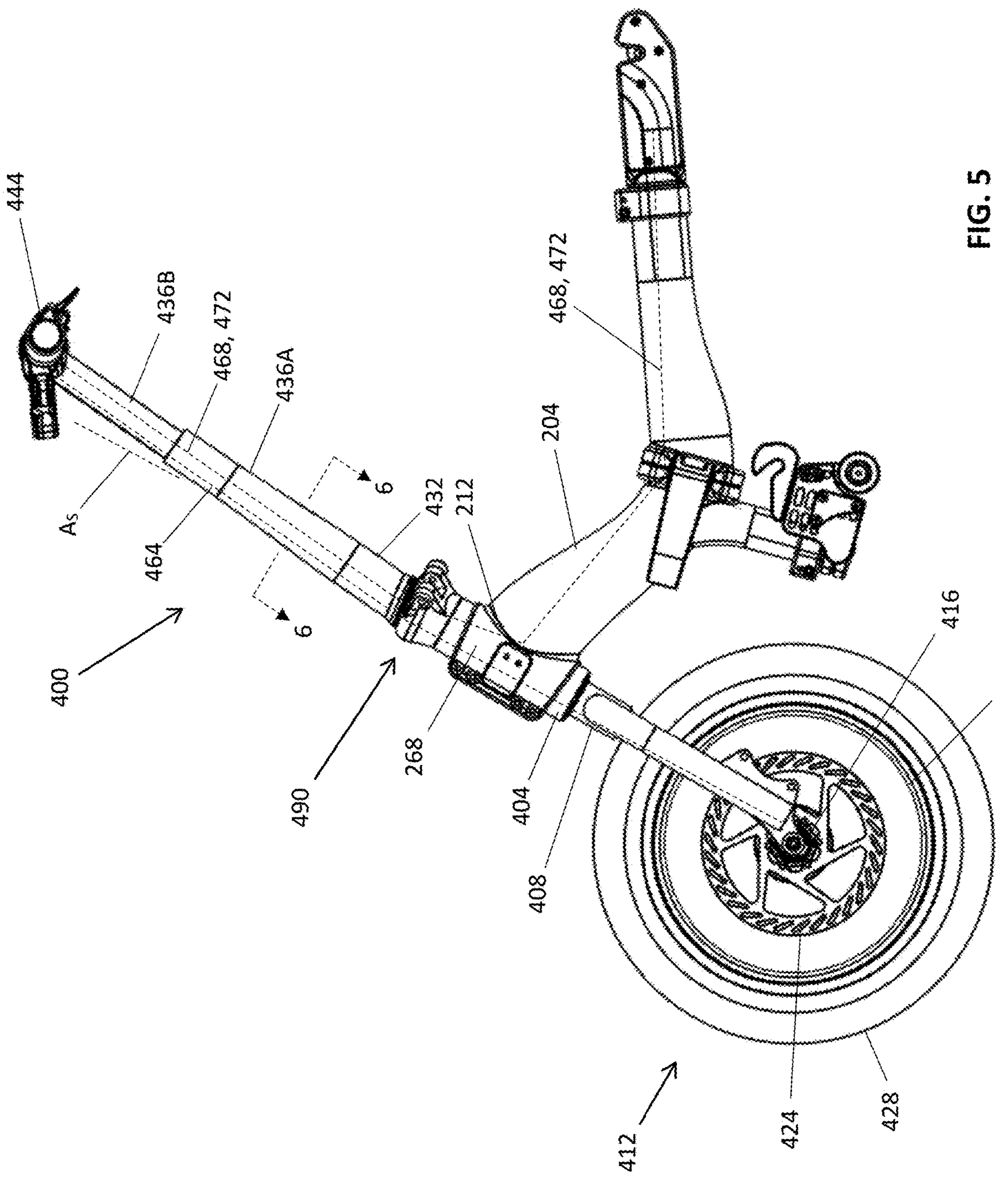
FIG. 5 is a side view of the steering assembly of FIG. 1.

As illustrated in FIGS. 4-5, a mounting assembly 268 is positioned at the second end 212 of the frame member 204. The mounting assembly 268 (also referred to as a compression arm 268 or a compression assembly 268) is coupled to the frame member 204 and configured to engage and retain the steering device 400. Thus, the steering device 400 is coupled to the second end 212 of the frame member 204. With specific reference to FIG. 5, the steering device 400 includes a head tube 404 (also referred to as a steering tube 404). The head tube 404 is received, and retained, by the mounting assembly 268. The head tube 404 is configured to be nonrotatable relative to the frame member 204. The head tube 404 receives a fork 408. The fork 408 extends completely through the head tube 404, and is configured to rotate relative to the head tube 404. A front wheel assembly 412 is mounted to one end of the fork 408. The front wheel assembly 412 includes a wheel hub 416, a rim 420, a brake 424, and a tire 428. The wheel hub 416 (also referred to as a tire hub 416) is coupled to the fork 408. A rim 420 is coupled to the wheel hub 416, for example by a plurality of spokes (not shown). A brake 424 is coupled to the wheel hub 416. In the illustrated embodiment, the brake 424 is a disc brake that includes a caliper (not shown). In other embodiments, the brake 424 can be any suitable type of brake for selectively slowing rotation of the front wheel hub 416 (and associated wheel). The rim 420 carries a tire 428. The tire 428 includes an outer tread (not shown) and contains a tube (not shown) for inflation of the tire 428.

Figure 6:
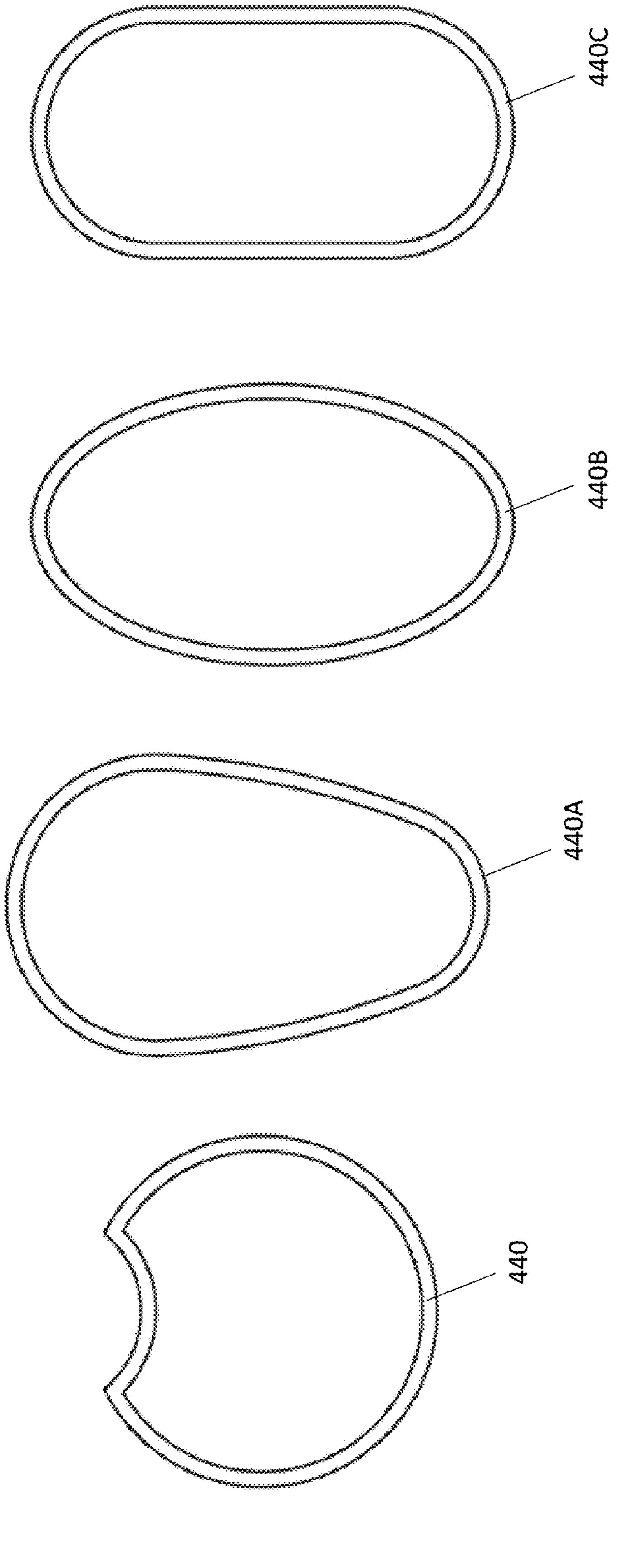
FIG. 6 is a cross-sectional view of the steering stem taken along line 6-6 of FIG. 5, illustrating a cross-sectional geometry and alternative geometries.

A stem 432 is coupled to the fork 408 at an end opposite the front wheel assembly 412. The stem is coupled to a handlebar 444 at an end opposite the connection to the fork 408. The stem 432 (also referred to as a steering stem 432) in defined by a plurality of tubular members 436. As illustrated, the plurality of tubular members 426 can include a first tubular member 436A and a second tubular member 436B. In other embodiments, the plurality of tubular members 436 can include three or more members 436. The plurality of tubular members 436 are substantially hollow cylindrical members. In addition, the plurality of tubular members 436 are configured to telescope, or slide, relative to each other to facilitate height adjustment of the handlebar 444 relative to the wheelchair 10 based on a user preference and/or collapsibility of the stem 432. Each tubular member 436 has a cross sectional shape that facilitates sliding movement of the tubular members 436 relative to each other but restricts rotational movement of the tubular members 436 relative to each other. This allows for sliding adjustment between the members 436 (to adjust a height of the stem 432), while also allowing the members 436 to rotate together in response to rotational movement of the stem 432 by the user while steering the steering device 400. With reference to FIG. 6, several examples of different cross-sectional geometries are shown that can be applied to each tubular member 436. A cross-section geometry 440 of the illustrated members 436 is generally circular with a crescent recess. However, in other embodiments, the geometry can be adjusted to facilitate sliding of the members 436 relative to each other, while facilitating joint (or collective) rotation of the members 436. For example, in other examples of embodiments, the cross-sectional geometry 440A can be an oval with one axis of symmetry. In yet further examples of embodiments, the cross-sectional geometry 440B can be an ellipse. In additional examples of embodiments, the cross-sectional geometry 440C can be a stadium or discorectangle. It should be appreciated that the cross-section geometry can be any suitable shape that facilitates sliding, telescopic adjustment between the members 436 while also facilitating joint rotation of the members 436. While the illustrated cross-sectional geometries are discussed in association with the tubular member 436, it should be appreciated that one or more of these geometries can also be incorporated into additional components of the steering assembly 100 to facilitate sliding adjustment of consecutive members while limiting rotation (or joining rotation) of the consecutive members. For example, the first end 208 of the frame member 204 (shown in FIG. 3) has a cross-sectional geometry of the oval with one axis of symmetry 440A. This geometry facilitates slidable engagement with the mounting assembly 300 (i.e., along the first axis $A_1$), while limiting (or restricting) rotational movement between the mounting assembly 300 and the frame member 204. Similarly, the lift support member 224 can have a cross-sectional geometry of the oval with one axis of symmetry 440A to facilitate sliding engagement that restricts rotation of the lift assembly 220. Further, each foot support member 236A, 236B can have a cross-sectional geometry of the oval with one axis of symmetry 440A to facilitate sliding engagement that restricts rotation of each respective member 244A, 244B. In other embodiments, the frame member 204 and the first end 208, the lift support member 224 and the lift assembly 220, the first foot support member 236A and the second member 244A, and/or the second foot support member 236B and the third member 244B can have any geometry shown in FIG. 4, or any suitable geometry that facilitates sliding movement of the connected components, while limiting (or restricting) rotational movement between the connected components.

Figure 7:
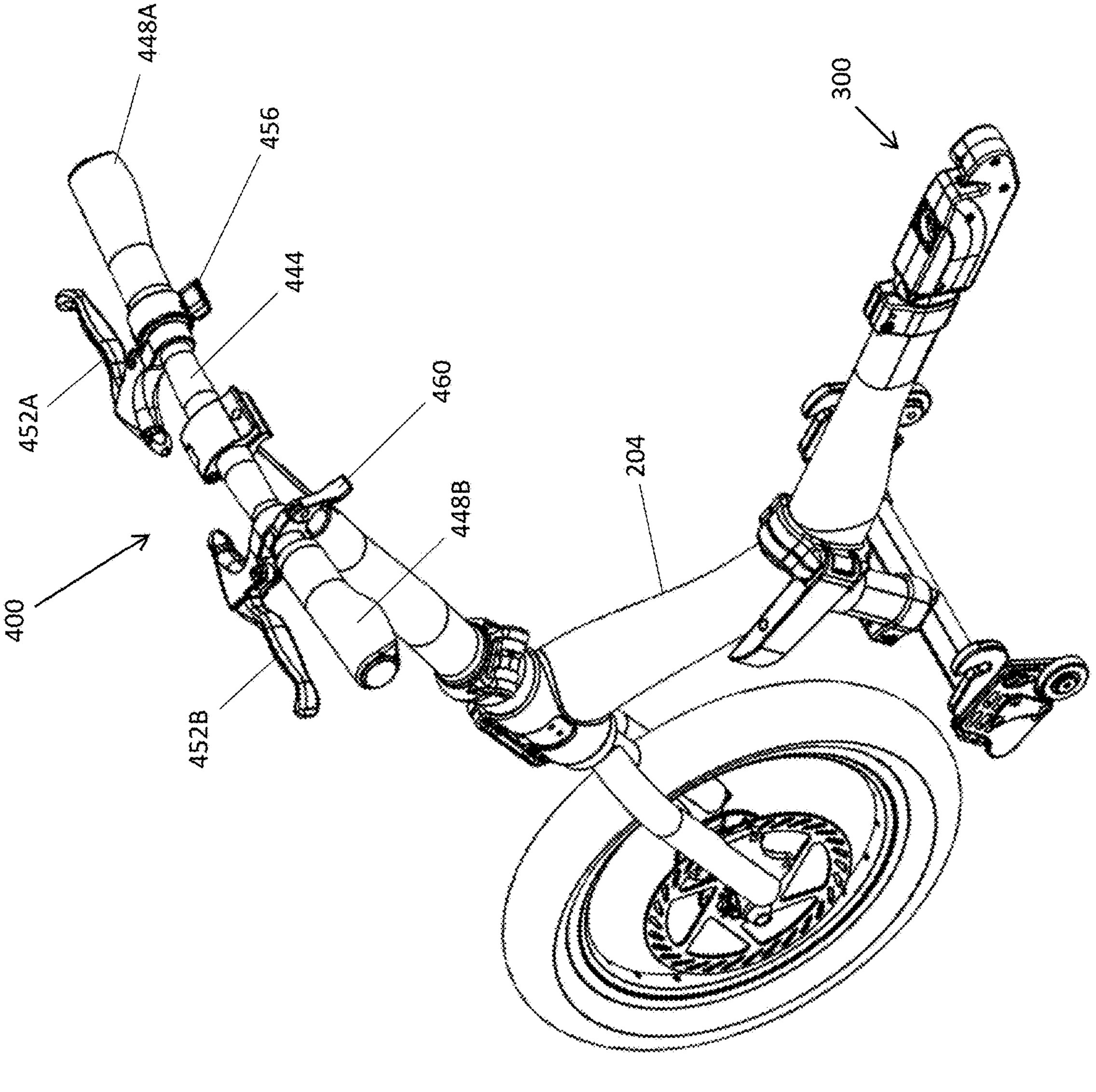
FIG. 7 is a perspective view of the steering assembly of FIG. 1, illustrating the handlebars of the steering device.

Referring now to FIG. 7, the handlebar 444 includes a plurality of handgrips 448A, B. The handgrips 448A, B provide a user a contact point to grasp and operate the handlebar 444. The handlebar 444 includes a plurality of brake actuators 452A, B (also referred to a brake levers 452A, B). Each brake actuator 452A, B is positioned relative to a respective handgrip 444A, B to allow the user to actuate one (or both) of the brake actuators 452A, B to initiate braking while continuing to engage the handgrips 448A, B. A throttle 456 is positioned relative to a first handgrip 448A, while a release actuator 460 (also called a release lever 460) is positioned relative to a second handgrip 448B. The throttle 456 can also be referred to as a first actuator 456, while the release actuator 460 can also be referred to as a second actuator 460. It should be appreciated that while the release actuator 460 is illustrated on the handlebar 444, and more specifically near the second handgrip 448B, this positioning is intended to be nonlimiting. The release actuator 460 can be positioned at any suitable position or location that is accessible by the user. For example, the release actuator 460 can be positioned at any suitable or desired location on the handlebar 444, can be positioned on one of the members 436 (see FIG. 3), can be positioned on the frame member 204, etc.

With reference back to FIG. 5, the head tube 404 defines a steering axis $A_s$. The steering axis $A_s$ is the axis about which the steering components (e.g., the fork 408, the front wheel assembly 412, the stem 432, the handlebar 444, etc.) rotate. More specifically, the handlebar 444 is configured to be engaged by the user (though one or both handgrips 448A, B). As the user rotates the handlebar 444, the stem 432 responsively rotates, which in turn rotates the fork 408 and the front wheel assembly 412. The fork 408 rotates relative to the head tube 404, which remains stationary and coupled to the frame assembly 200 by the frame member 204. It should be appreciated that the stem 432 can be positioned at an angle to the steering axis $A_s$ defined by the head tube 404. The steering axis $A_s$ can be any suitable angle preferred by a user. For example, the angle can be between approximately zero degrees (0°) and approximately forty-five degrees (45°), and more specifically between approximately zero degrees (0°) and approximately thirty degrees (30°), and more specifically approximately zero degrees (0°) and approximately twenty degrees (20°), and more specifically approximately zero degrees (0°) and approximately fifteen degrees (15°), and more specifically approximately zero degrees (0°) and approximately twelve degrees (12°). Accordingly, the stem 432 can be positioned along the steering axis $A_s$, or can be angled from the steering axis $A_s$, for example up to approximately forty-five degrees (45°), and more specifically up to approximately thirty degrees (30°), and more specifically up to approximately twenty degrees (20°), and more specifically up to approximately fifteen degrees (15°), and more specifically up to approximately twelve degrees (12°), and more specifically less than approximately twelve degrees (12°). One or both of the brake actuators 452A, B are in operable communication with the brake 424. For example, a brake cable 464 (shown in broken lines) can extend from the brake actuators 452A, B, through the hollow stem 432, to the brake 424. This allows actuation of the brake actuator(s) 452A, B to initiate operation of the brake 424 (e.g., engage the caliper with the disc, etc.). The throttle 456 and the release actuator 460 are each in operable communication with the mounting assembly 300. For example, a throttle cable 468 (or electrical cable 468) (shown in broken lines) can extend from the throttle 456, through the hollow stem 432, through the frame member 204 (e.g., from the second end 212 to the first end 208) to the mounting assembly 300. As another example, a release cable 472 (shown in broken lines) can extend from the release actuator 460, through the hollow stem 432, through the frame member 204 (e.g., from the second end 212 to the first end 208) to the mounting assembly 300. In other embodiments, the throttle 456 and/or the release actuator 460 can be in communication with the mounting assembly 300 wirelessly (e.g., Bluetooth, etc.) or through any suitable communication system to respectively provide throttle adjustment or release of the mounting assembly 300 in response to actuation of the respective throttle 456 or release actuator 460.

Figure 8:
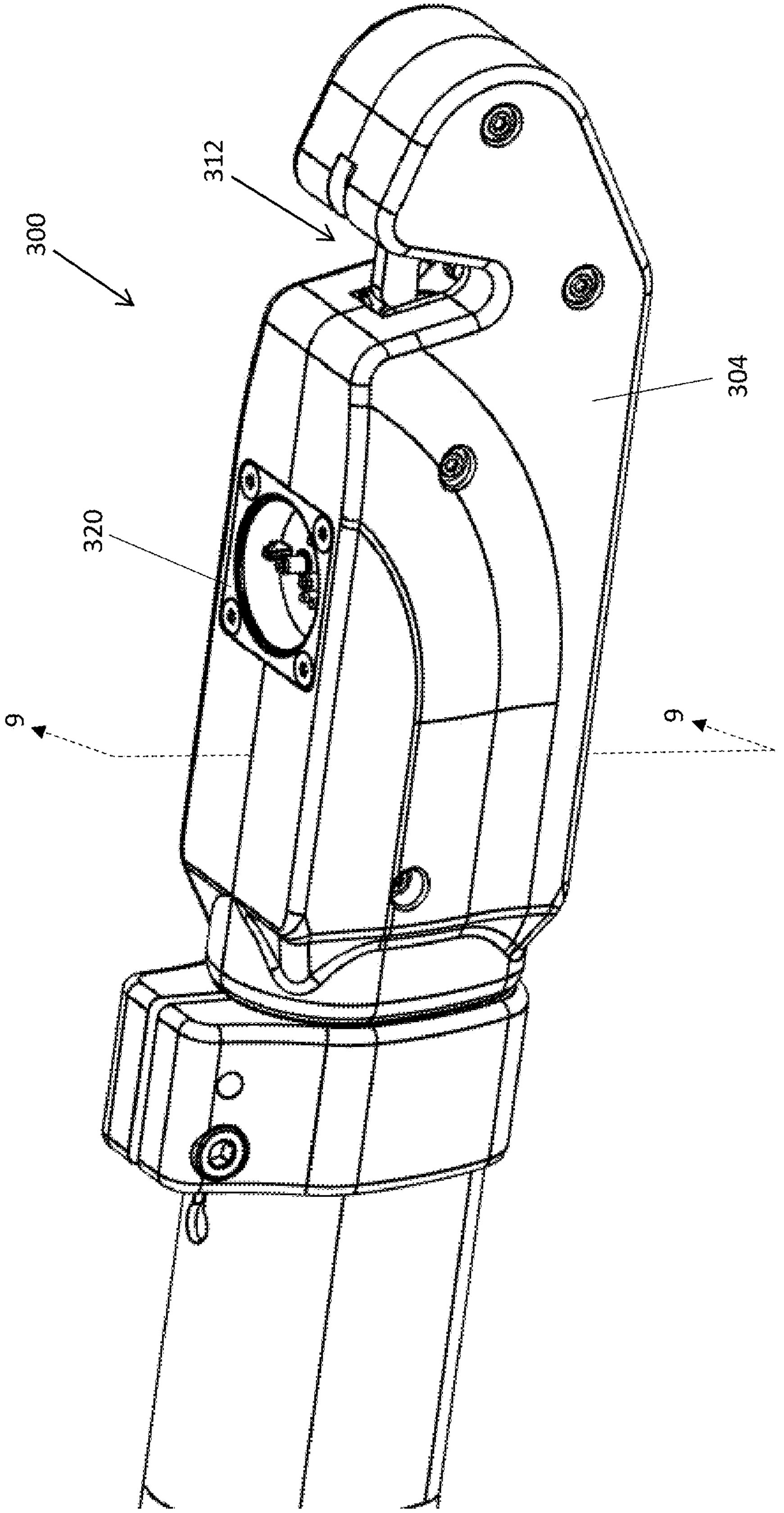
FIG. 8 is a perspective view of the mounting assembly of the steering assembly of FIG. 1.

With reference now to FIG. 8, the mounting assembly 300 includes the outer housing 304, which is formed of two mating halves that couple to form the housing 304 (or cover 304). A plurality of fasteners (e.g., bolts, screws, etc.) couple the halves of the outer housing 304, while also fastening the outer housing 304 to the mounting member 308. The outer housing 304 defines a channel 312 (also referred to as a recess 312). The channel 312 provides access to a portion of a latch assembly 316 (shown in FIG. 9). The outer housing 304 also defines a recess that receives an electrical connector 320. The latch assembly 316 provides a mechanical connection between the steering assembly 100 and the wheelchair 10, while the first electrical connector 320 provides an electrical connection between the steering assembly 100 and the wheelchair 10.

Figure 9:
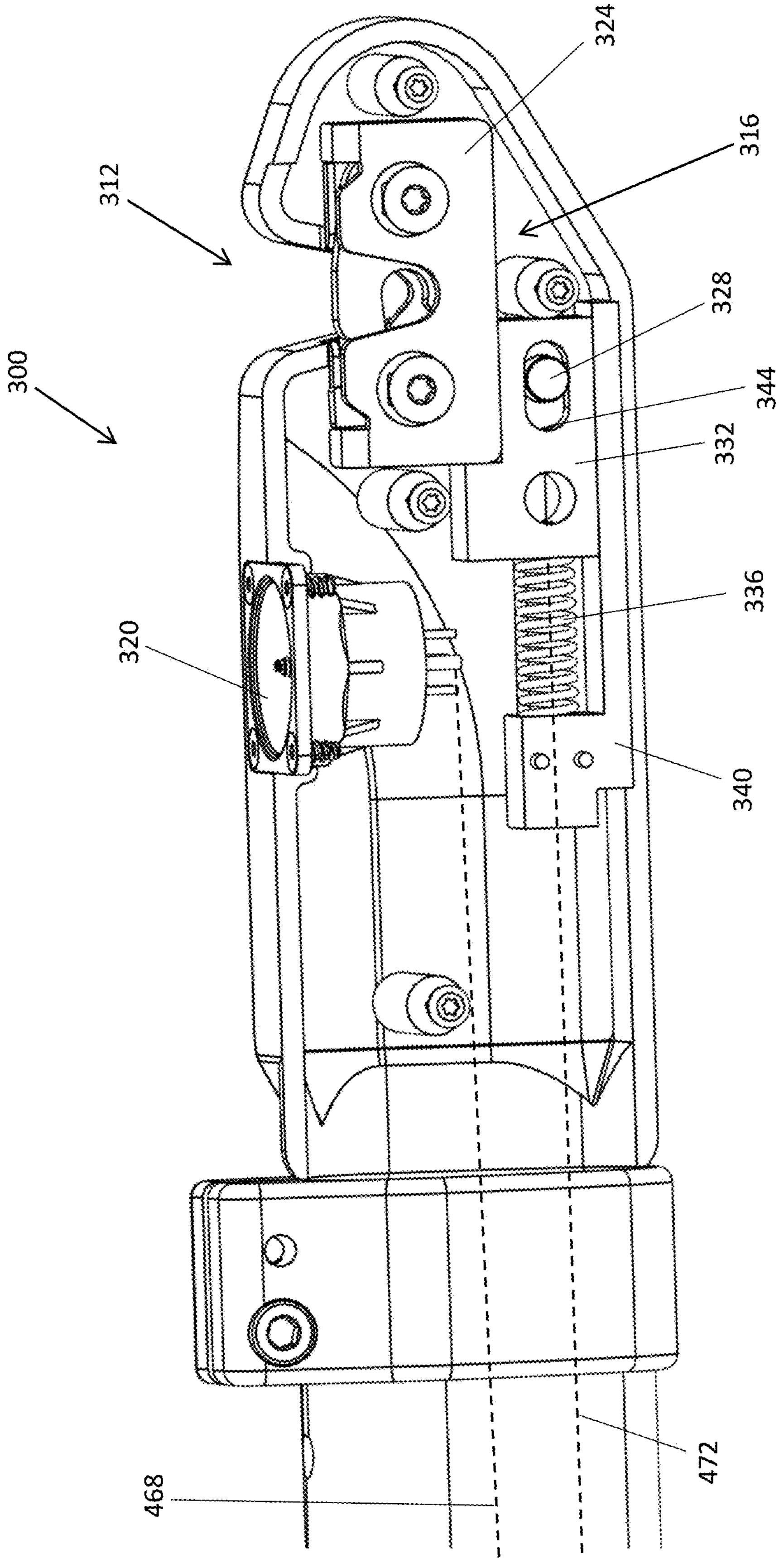
FIG. 9 is a cross-sectional view of the mounting assembly of FIG. 8, taken along lines 9-9 of FIG. 8, and with a throttle cable and a release cable removed for clarity.

With reference now to FIG. 9, the latch assembly 316 includes a latch portion 324, a latch release pin 328, a latch cable bracket 332, a biasing member 336, and a holder 340. The latch portion 324 is a latch that is configured to be actuated between a locked position (illustrated in FIG. 9), and an unlocked position. In the illustrated embodiment the latch portion 324 is a rotary latch. However, in other embodiments, the latch portion 324 can be any suitable latch or locking assembly that can be actuated between a locked portion and an unlocked position. The latch release pin 328 engages a portion of the latch portion 324, specifically an arm (not shown) that actuates the latch between the locked and unlocked position. The latch release pin 328 is received by the latch cable bracket 332, and specifically an elongated aperture 344 defined by the latch cable bracket 332. The latch cable bracket 332 is biased by a biasing member 336 (or spring 336). The biasing member 336 contacts the latch cable bracket 332 on one end, and the holder 340 at the opposite end. The latch cable bracket 332 is configured to slide along a portion of the holder 340. The release cable (not shown), which extends from the release actuator 460, engages the latch cable bracket 332.

The electrical connector 320 is a first electrical connector 320, shown as a male electrical connector 320. The first electrical connector 320 is electrically connected to the throttle 456 by the throttle cable 468 (or electrical cable 468). The first electrical connector 320 can include one or more magnets to facilitate a magnetic connection with a corresponding second electrical connector 528, discussed in addition detail below. It should be appreciated that the latch assembly 316 can also be referred to as a first connection assembly 316, and the first electrical connector 320 can also be referred to as a second connection assembly 320.

Figure 10:
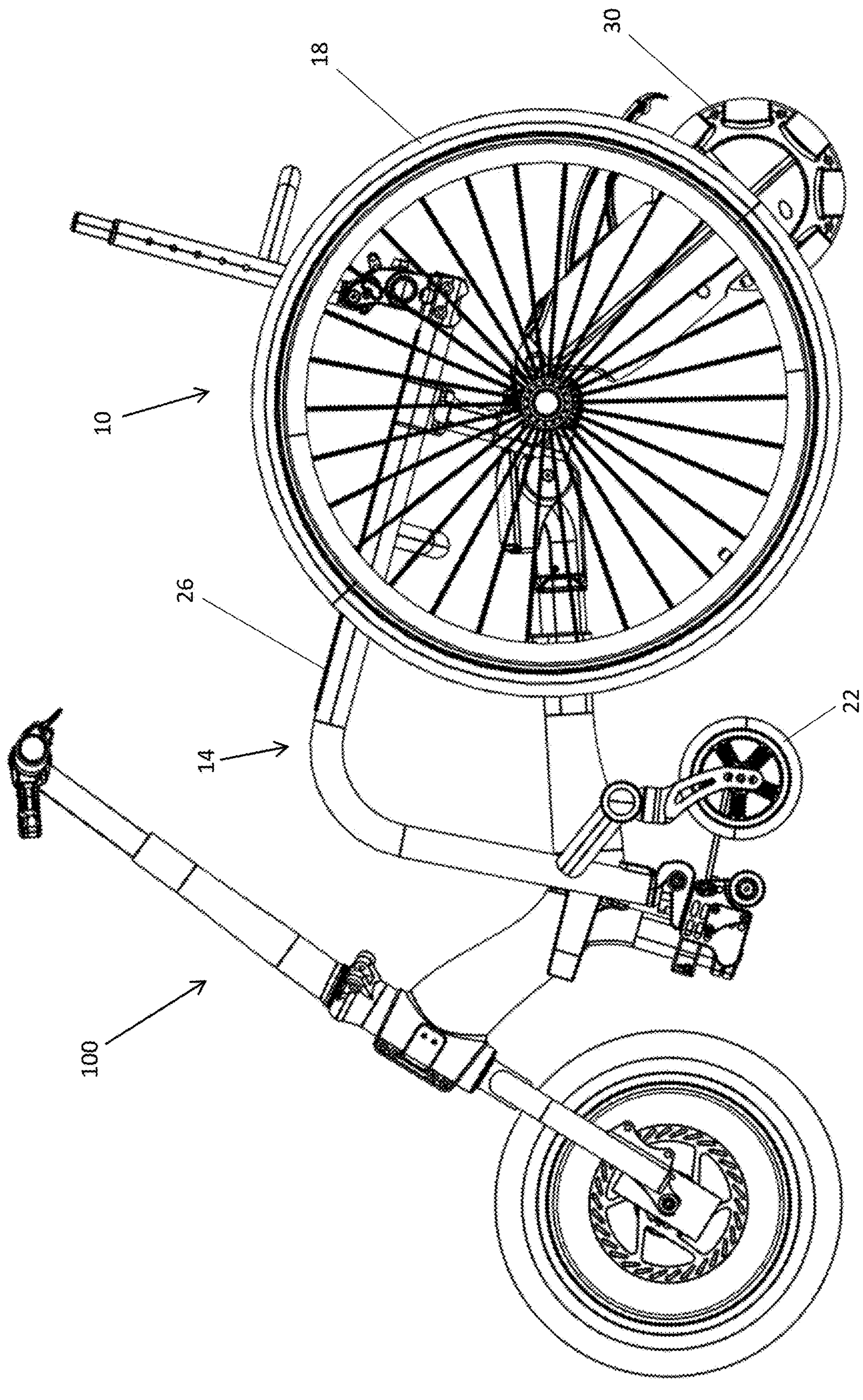
FIG. 10 is a side view of the steering assembly of FIG. 1 attached to a wheelchair.
Figure 11:
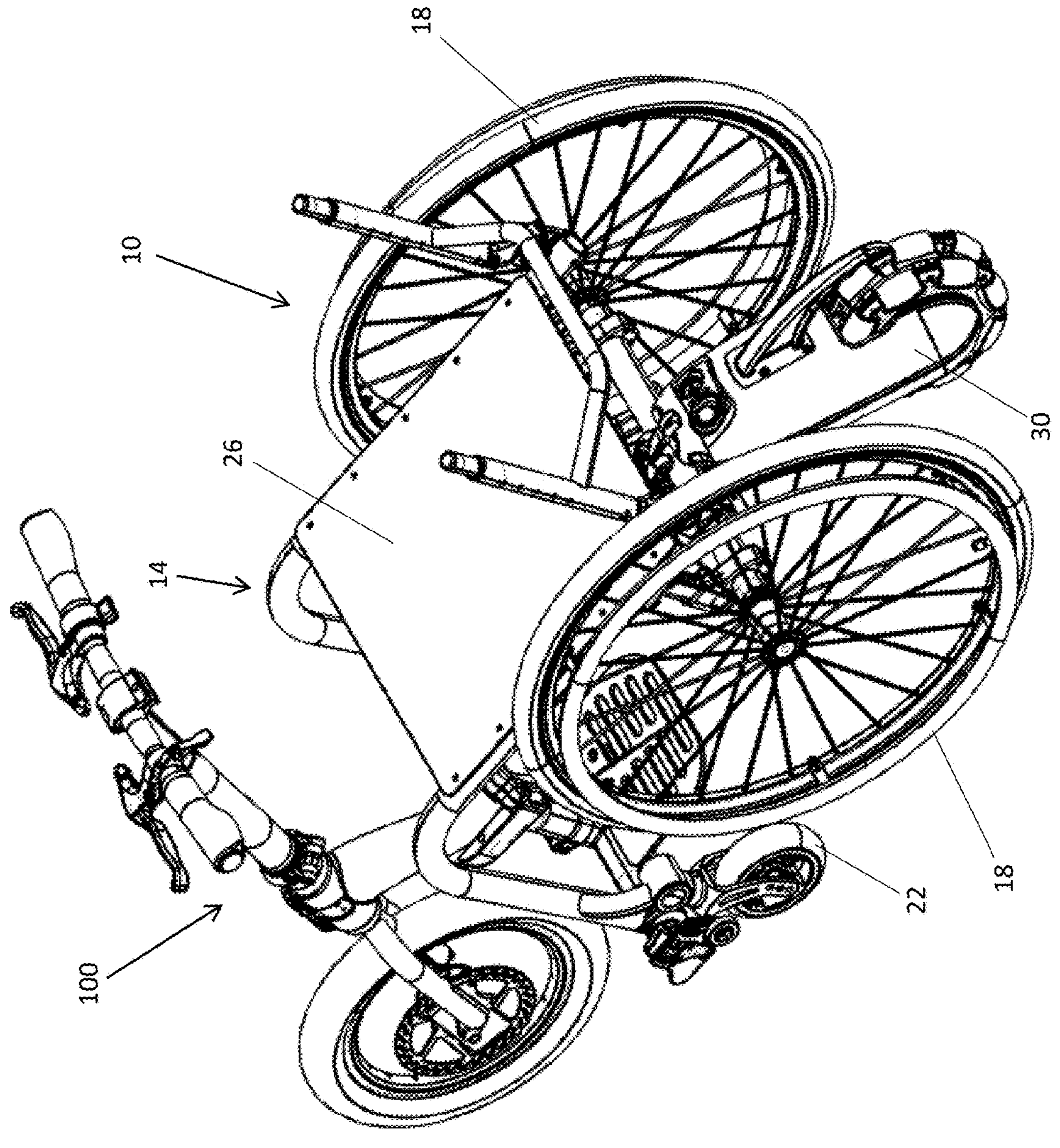
FIG. 11 is a perspective view of the steering assembly attached to the wheelchair of FIG. 10.
Figure 12:
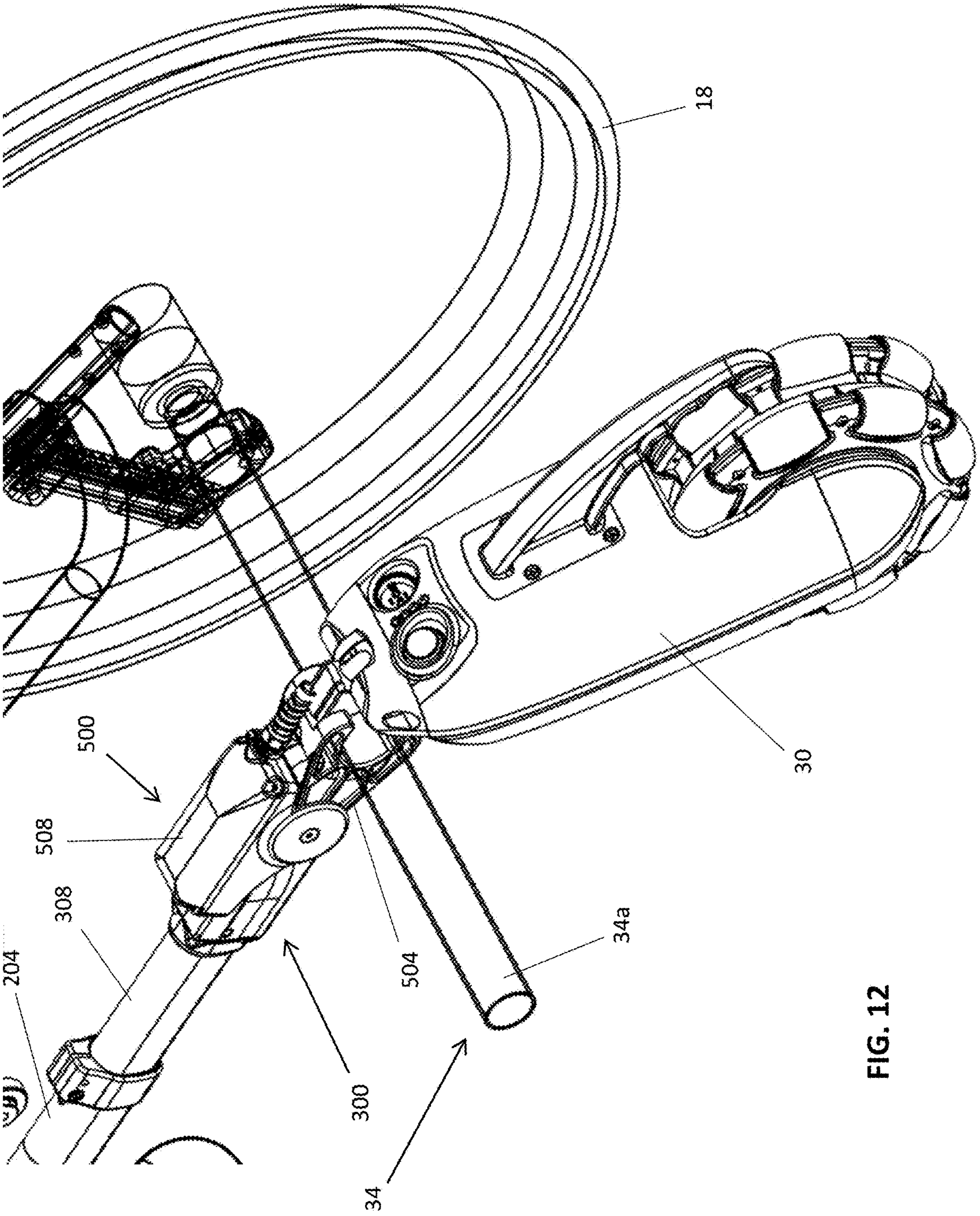
FIG. 12 is a perspective view of the steering assembly attached to the rear axle of the wheelchair of FIG. 10, illustrating one of the rear wheels and an electrical cable connecting the drive assist to the connection assembly being removed for clarity to illustrate attachment of the steering assembly and the drive assist fastened to the wheelchair.

With reference now to FIGS. 10-12, the steering assembly 100 is shown selectively attached to the wheelchair 10. The wheelchair 10 is illustrated as a manual wheelchair 10. With specific reference to FIGS. 10-11, the wheelchair 10 includes a frame assembly 14. The frame assembly 14 carries a pair of rear wheels 18 and a pair of caster wheels 22. The frame assembly 14 also carries a seat 26. It should be appreciated that FIG. 10 depicts a first side of the wheelchair 10. A second, opposite side (not shown) is a mirror image to the illustrated first side, with the second side having the same components shown on the first side (e.g., a rear wheel 18, a caster wheel 22, etc.). A motorized drive assembly 30 is coupled to the wheelchair 10. More specifically, the motorized drive assembly 30 is coupled to a mounting assembly 34 fastened to the wheelchair 10. The motorized drive assembly 30 is a motorized drive system that provides motorized drive assistance to propel the wheelchair 10. In the illustrated embodiment, the motorized drive assembly 30 is a drive assist 30 that provides motorized propulsion to the wheelchair 10. The drive assist 30 is positioned rearward of the rear wheels 18, and more specifically rearward of an axis of rotation of the rear wheels 18. The axis of rotation of the rear wheels 18 can be defined by a rear axle of the wheelchair 10. In at least one example of an embodiment, a portion of the drive assist 30 is positioned rearward of the rear axle of the wheelchair 10. In other examples of embodiments, a majority of the drive assist 30 is positioned rearward of the rear axle of the wheelchair 10. Stated another way, the drive assist 30 can be configured to contact the surface upon which the wheelchair 10 is positioned (e.g., ground, flooring, etc.) rearward of the axis of rotation of the rear wheels 18. In addition, the drive assist 30 can be coupled to the wheelchair 10 at a position between the rear wheels 18. For example, the drive assist 30 can be coupled (or mounted or fastened) to a portion of the frame assembly 14 of the wheelchair 10 located between the rear wheels 18. Stated another way, the rear wheels 18 can define an outer boundary, the outer boundary being perpendicular to the rear axle (and perpendicular to the axis of rotation of the rear wheels 18). The drive assist 30 can be coupled (or mounted or fastened) to a portion of the frame assembly 14 of the wheelchair 10 located between (or defined by) the outer boundary. The drive assist 30 is configured to apply a driving force to the wheelchair 10 to drivingly assist with rotation of the rear wheels 18. The illustrated drive assist 30 is a SMARTDRIVE drive assist sold by Max Mobility LLC a division of Permobil AB, which has a corporate headquarters in Timrå, Sweden. It should be appreciated that in other embodiments, the motorized drive assembly 30 can be any suitable drive system that facilitates propulsion of the wheelchair 10. The mounting assembly 34 can include at least one mounting member **34*a* configured to facilitate a connection of the motorized drive assembly 30 to the wheelchair 10. In addition, the mounting member 34*a* can be any suitable member configured to facilitate a connection of the steering assembly 100 to the wheelchair 10. The mounting member 34*a* can be fastened (or coupled) to the wheelchair 10, and more specifically fastened (or coupled) to the frame assembly 14. In the example of embodiment shown in FIGS. 10-12, the mounting member 34*a* is the rear axle of the wheelchair 10. The rear axle 34*a* connects the rear wheels 18 to the frame assembly 14. In other examples of embodiments of the wheelchair 10, the mounting member 34*a* can be a member separate from the rear axle. For example, the mounting member 34*a* can be coupled to the frame assembly 14. The mounting member 34*a* can be positioned on the frame assembly 14 on a side of the seat 26 opposite a side engaged by the user. The mounting member 34***a* can be positioned between the casters 22 and the rear axle or can be positioned on a side of the rear axle opposite the side closest to the casters 22. It should be appreciated that the mounting member 34*a* can be movable relative to the frame assembly 14. For example, in embodiments where the wheelchair 10 is a folding wheelchair, the mounting member 34*a* can be configured to move, pivot, or collapse relative to the frame assembly to facilitate folding (or collapsibility) of the frame assembly 14. It should also be appreciated that the mounting assembly 34 can include at least one member 34*a* or a plurality of members 34*a*. For example, the mounting assembly 34 can include a first mounting member and a second mounting member. In some embodiments, both the first and second mounting members can be fastened (or coupled) to the frame assembly 14. In some embodiments, the first mounting member can be fastened (or coupled) to the frame assembly 14 on a caster 22 side of the rear axle, while the second mounting member can be fastened (or coupled) to the frame assembly 14 on an opposite side of the rear axle. In another example of an embodiment, one of the first or second mounting member can be the rear axle. To this end, the term mounting assembly 34 can include at least one member, and further can include a plurality of members.

Figure 13:
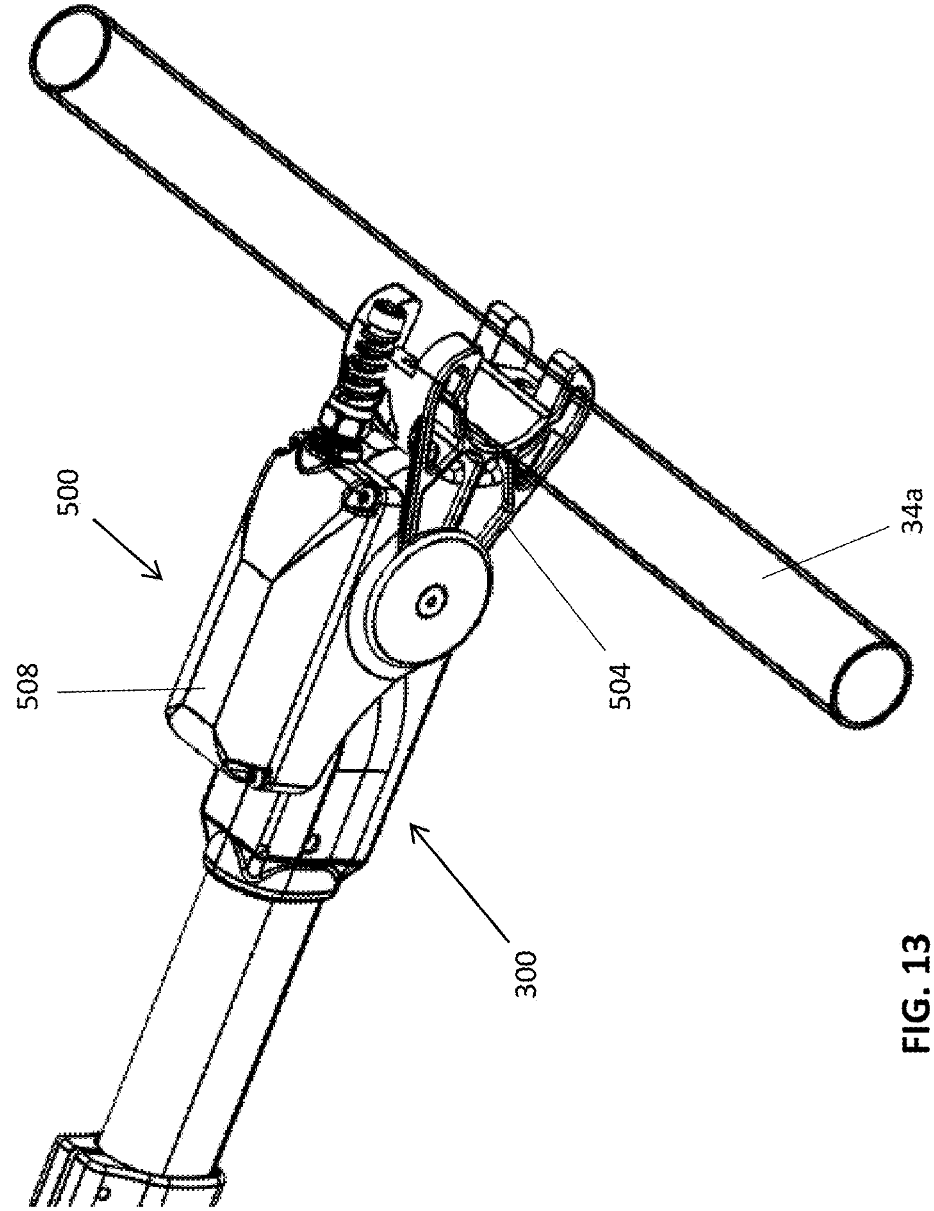
FIG. 13 is a perspective view of the connection assembly attached to the rear axle of the wheelchair, and the mounting assembly selectively connected to the connection assembly, the drive assist and other wheelchair components removed for clarity.

With reference now to FIGS. 12-13, a connection assembly 500 is coupled to the mounting member 34*a* of the wheelchair 10. The mounting member 34*a* is illustrated as the rear axle 34*a* of the wheelchair 10. The connection assembly 500 facilitates the mechanical and electrical connection between the steering assembly 100 and the wheelchair 10. More specifically, the connection assembly 500 facilitates the mechanical connection between the mounting assembly 300 and the rear axle 34*a* of the wheelchair 10. Further, the connection assembly 500 facilitates the electrical connection between the steering assembly 100 and the motorized drive assembly 30 mounted to the wheelchair 10. The connection assembly 500 includes a first connection portion 504 and a second connection portion 508. The first and second connection portions 504, 508 are coupled by at least one fastener (e.g., a bolt, a screw, etc.).

Figure 14:
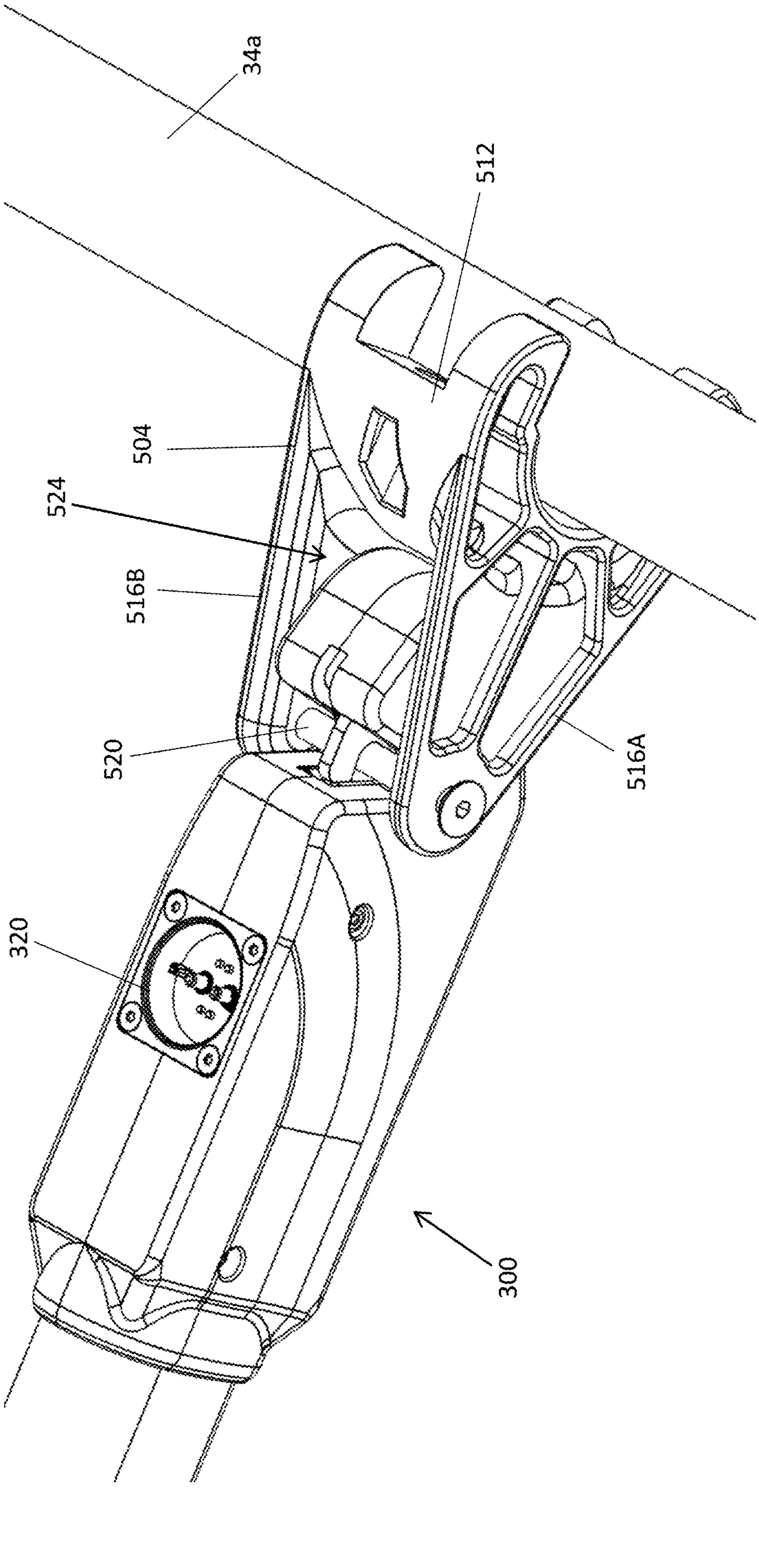
FIG. 14 is perspective view of the mounting assembly coupled to a first connection portion of the connection assembly, a second connection portion removed for clarity.

With reference to FIG. 14, the first connection portion 504 facilitates the selective mechanical connection between the mounting assembly 300 of the steering assembly 100 and the rear axle 34*a* of the wheelchair 10. The first connection portion 504 includes a mounting member attachment portion 512 (also referred to as an axle attachment portion 512) that is configured to couple the connection assembly 500 to wheelchair 10, and more specifically to the rear axle 34*a* of the wheelchair 10. The first connection portion 504 also includes opposing side members 516A, B. A latch pin 520 extends between the side members 516A, B. The side members 516A, B also define an aperture 524 that is configured to receive a portion of the mounting assembly 300 upon engagement.

Figure 15:
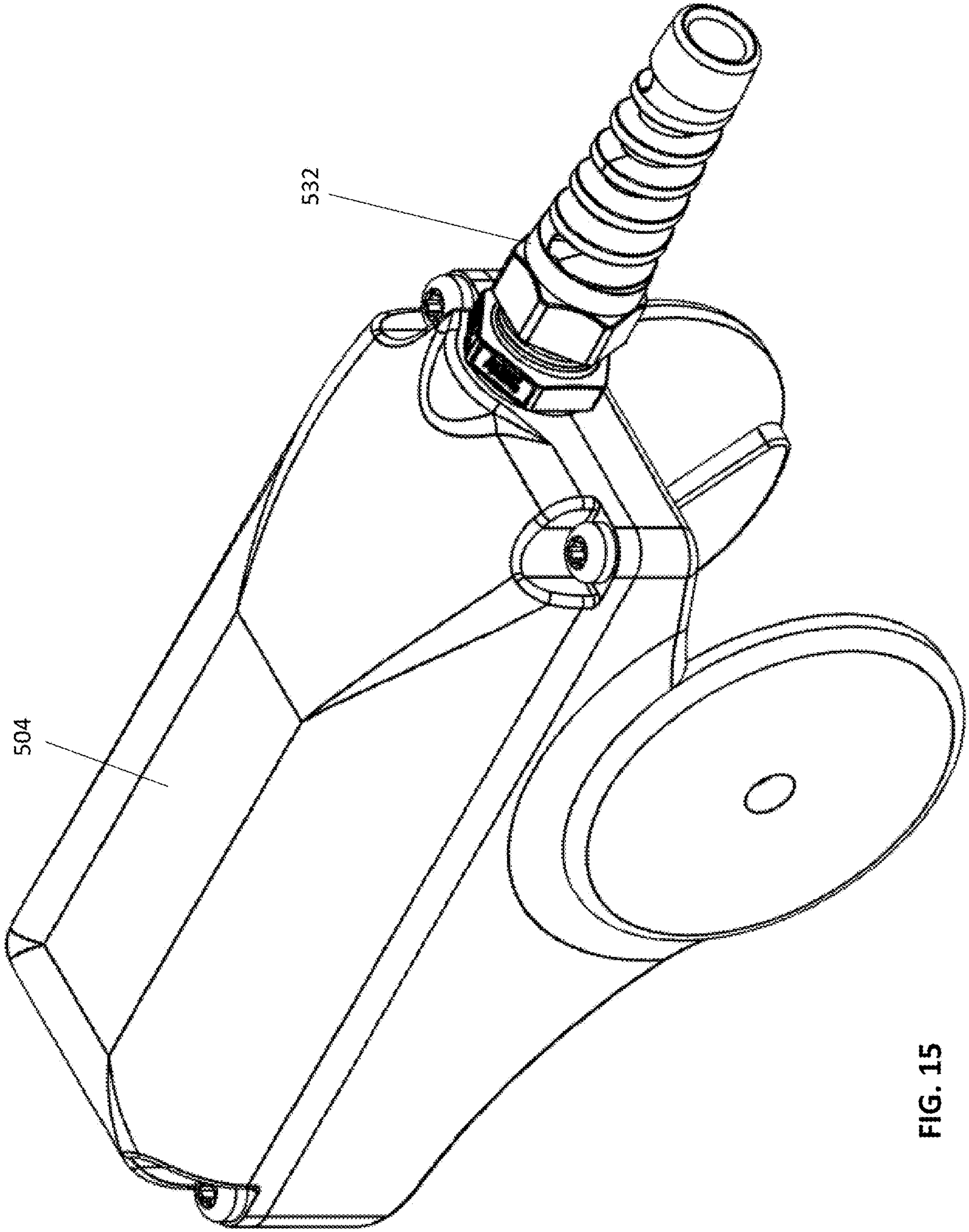
FIG. 15 is a perspective view of the second connection portion detached from the first connection portion of the connection assembly.
Figure 16:
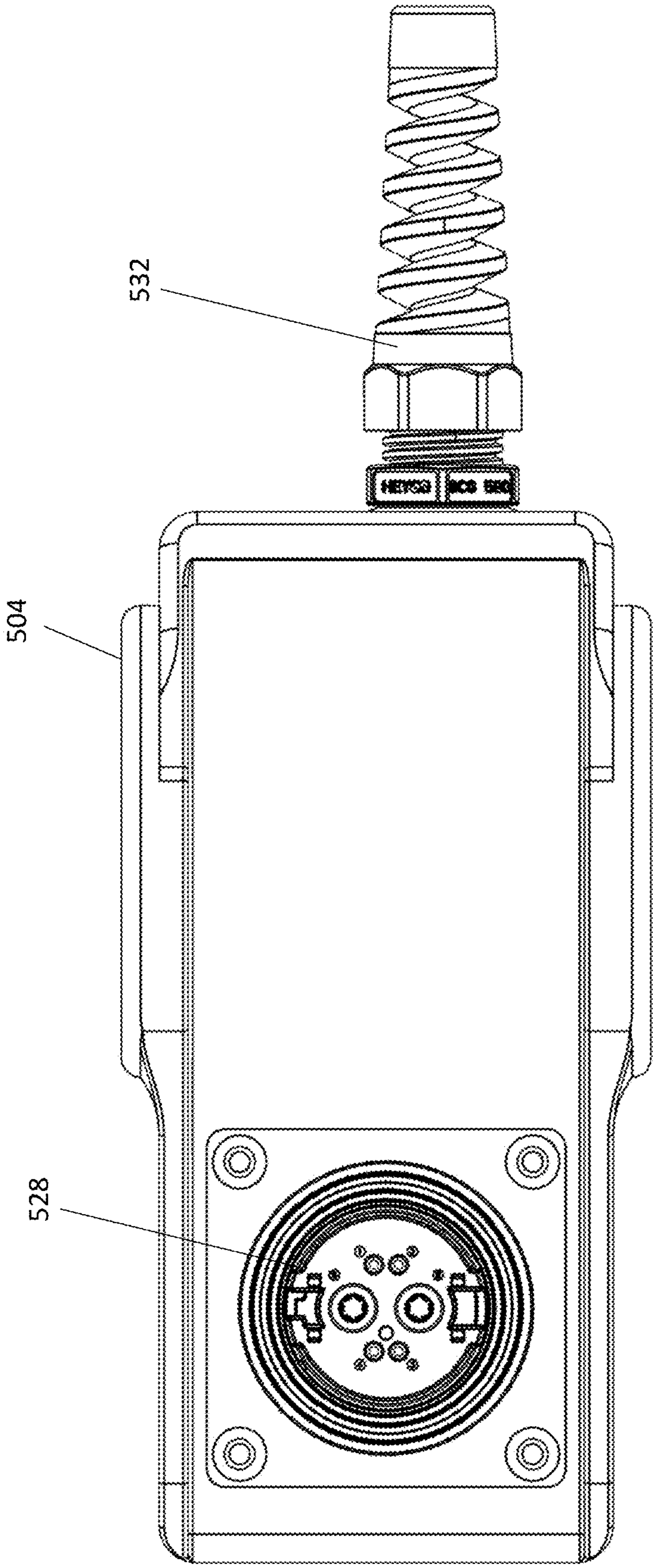
FIG. 16 is a perspective view of a bottom of the second connection portion of FIG. 15.

Referring now to FIGS. 15-16, the second connection portion 508 includes a second electrical connector 528 (shown in FIG. 16) and an electrical cable 532 that is configured to engage the motorized drive assembly 30 (shown in FIG. 12). The second electrical connector 528 and the electrical cable 532 are operably connected within the second connection portion 508 to direct the necessary communication from the connection assembly 500 to the motorized drive assembly 30. The second electrical connector 528 is illustrated as a female electrical connector that is configured to engage the male electrical connector of the first electrical connector 320. The second electrical connector 528 can include one or more magnets to facilitate the magnetic connection with the corresponding first electrical connector 320. In other embodiments, one of the first or second electrical connectors 320, 528 can be a male electrical connector, while the other 528, 320 can be a complimentary female electrical connector. In other embodiments, the first and second electrical connectors 320, 528 can be any combination of selectively removable connectors suitable to electrically connect the steering assembly 100 to the motorized drive assembly 30 of the wheelchair 10. It should be appreciated that the magnets associated with the connectors 320, 528 can be optional. In other examples of embodiments, the connectors 320,528 can be connected without a magnetic connection. In these embodiments, the connectors 320, 528 can engage (or otherwise connect) through a mechanical connection, or any other suitable connection of the connectors 320, 528 to facilitate the associated electrical connection.

In operation, the mounting assembly 300 is configured to selectively engage the connection assembly 500 to removably attach the steering assembly 100 to the wheelchair. Once attached, the mounting assembly 300 selectively couples to a mounting member 34*a* of the mounting assembly 34, such as the rear axle 34*a* of the wheelchair 10, while also selectively electrically connects the steering assembly 100 to the motorized drive assembly 30.

To attach the steering assembly 100 to the wheelchair 10, the user positions the steering assembly 100 such that the first end 208 extends from a front of the wheelchair 10 underneath towards the mounting member 34*a*.

The user then lifts the first end 208 of the steering assembly 100 (or the first end 208 of the frame member 204). More specifically, the user can orient the steering assembly 100 such that the rollers 260 of the lift assembly 220 contact the surface the wheelchair is positioned on (e.g., ground, flooring, etc.). The front wheel assembly 412 is also in contact with the surface. In this balanced position, the user can grasp a portion of the steering assembly 100, for example the handlebar 444 or a portion of the frame member 204, and lift the first end 208 off of the surface and towards the mounting member 34*a* by pivoting the steering assembly 100 relative to the front wheel assembly 412. As the user lifts the first end 208 off the surface, the front wheel assembly 412 remains in contact with the surface, but the rollers 260 are lifted off the surface.

When the user lifts the first end 208 off the surface, the mounting assembly 300 is lifted towards the connection assembly 500 coupled to the rear axle. The channel 312 receives the latch pin 520, which directs the latch pin 520 to engage the latch assembly 316, and more specifically the latch portion 324. Once the latch portion 324 receives and engages the latch pin 520, the mounting assembly 300 is coupled to the mounting member 34*a* by the connection assembly 500.

As the mechanical connection between the mounting assembly 300 and the mounting member 34*a* occurs, the electrical connection also occurs. The first electrical connector 320 is lifted by the mounting assembly 300 towards the second electrical connector 528 of the connection assembly 500. The magnets of the connectors 320, 528 interact to draw the connectors 320, 528 together. Accordingly, the first electrical connector 320 engages with the second electrical connector 528 to form the selective electrical connection between the steering assembly 100 and the motorized drive assembly 30.

With the mounting assembly 300 coupled to the mounting member 34*a*, and electrically connected to the motorized drive assembly 30, the user can couple the lift assembly 220 to a portion of the wheelchair 10. For example, the user can engage the hooks 264 of the lift assembly 220 with a respective mounting member positioned on a portion of the wheelchair support tubing.

The steering assembly 100 is accordingly coupled to the wheelchair 10 and free for use by the user. The user can depress the throttle 456, which will send communication to the motorized drive assembly 30 to operate and drive the wheelchair 10. The communication travels from the throttle 456 to the first electrical connector 320 by the throttle cable 468, and from the first electrical connector 320 to the motorized drive assembly 30 by the second electrical connector 528 and the electrical cable 532. The user can then steer the driven wheelchair 10 with the handlebar 444, and slow the drive wheelchair 10 by the brake actuator 452. In other examples of embodiments, the throttle 456 can be in wireless communication with the motorized drive assembly 30 (e.g., Bluetooth, etc.) or through any suitable communication system to respectively provide throttle adjustment in response to actuation of the throttle 456.

The steering assembly 100 can then be selectively disengaged from the wheelchair 10. To initiate disengagement, the user can actuate the release actuator 460. In response, the latch cable bracket 332 overcomes the bias applied by the biasing member 336 and slides towards the holder 340. As the latch cable bracket 332 slides towards the holder 340, the elongated aperture 344 contacts the latch release pin 328, which in turn actuates the arm (not shown) to unlock the latch portion 324. The latch pin 520 is free for disengagement from the latch portion 324 of the latch assembly 316. The user can then terminate actuation of the release actuator 460. In response, the biasing member 336 slides the latch cable bracket 332 away from the holder 340. The elongated aperture 344 disengages from the latch release pin 328, which in turn stops actuation of the arm (not shown) to lock the latch portion 324. The mounting assembly 300 is then disengaged from the mounting member 34*a*, and more specifically from the connection assembly 500.

In response to disengagement of the mounting assembly 300 from the mounting member 34*a*, the electrical connection between the first and second electrical connectors 320, 528 is disengaged. For example, the weight of the mounting assembly 300 is sufficient to overcome the magnetic connection between the first and second electrical connectors 320, 528 such that the first electrical connector 320 disengages from the second electrical connector 528. Alternatively, or in addition, a user can pivot the steering assembly 100 relative to the front wheel assembly 412, while the front wheel assembly 412 remains in contact with the surface, to direct the first end 208 away from the mounting member 34*a*. The user can also disengage the hooks 264 of the lift assembly 220 from their respective mounting member positioned on a portion of the wheelchair support tubing. Finally, the user can lower the steering assembly 100 such that the associated lift assembly 220 lowers and the rollers 260 contact the surface. With the steering assembly 100 disengaged (or detached) from the wheelchair 10, the user is free to move the wheelchair 10 relative to the steering assembly 100, or free to move the steering assembly 100 relative to the wheelchair 10.

FIGS. 1-16 depict aspects of a steering assembly 100 that is illustrated as a passive, or non-motorized add on to the wheelchair 10. The steering assembly 100 is configured to cooperate with the motorized drive assembly 30 to provide steering functionality and drive functionality to the associated wheelchair 10. In the illustrated embodiments, the motorized drive assembly 30 effectively provides a rear-wheel drive to the wheelchair 10. However, in other embodiments, the steering assembly 100 can be an active add-on (otherwise referred to as a driven add-on). Stated another way, the steering assembly 100 can incorporate an active drive system that is configured to drive the front wheel assembly 412. In these embodiments, the active steering assembly 100 provides front-wheel drive to the wheelchair 10. The active steering assembly 100 can operate alone, or in combination with the motorized drive assembly 30 to provide both front and rear wheel drive capabilities to the wheelchair 10.

One or more aspects of the steering assembly 100 provides certain advantages. For example, the steering assembly 100 is configured to selectively couple to a mounting member of a wheelchair, which can include a rear axle of the wheelchair, and selectively electrically couple to a motorized drive assembly. This allows for steering control and acceleration/propulsion control by the user through the steering device. The steering assembly 100 is also configured to be attachable and detachable to provide selective attachment to the wheelchair 10. In addition, the illustrated steering assembly 100 does not include a motorization system, but instead connects to a motorized drive assembly coupled to the wheelchair 10. This substantially decreases the weight of the steering assembly 100, making it easier for the user of the wheelchair 10 to handle, move, or otherwise manipulate the steering assembly 100. In other embodiments, it may be desirable to include a motorization system in the steering assembly 100 to operate in conjunction with the motorized drive assembly 30, or alternatively to the motorized drive assembly 30. These and other advantages are realized by the disclosure provided herein.

What is claimed is:

1. A steering system for a wheelchair comprising:

a steering device configured to be engaged by a user;

a front wheel operably connected to the steering device; and a frame assembly configured to carry the steering device and the front wheel, wherein the frame assembly is configured to removably engage a connection assembly fastened to an axle of the wheelchair, wherein a motorized drive assembly is configured to removably engage the wheelchair, the motorized drive assembly being positioned rearward of the axle of the wheelchair, the axle defines an axis of rotation of a pair of rear wheels of the wheelchair, and wherein the connection assembly is configured to electrically connect the motorized drive assembly to the steering device.

2. The steering system of claim 1, wherein the motorized drive assembly is configured to removably engage the axle of the wheelchair.

3. The steering system of claim 2, wherein in response to the frame assembly being removably engaged with the connection assembly of the wheelchair, the steering device is in operable communication with the motorized drive assembly.

4. The steering system of claim 2, wherein the steering device includes a first user actuatable member operably connected to the motorized drive assembly, wherein in response to actuation of the first user actuatable member the motorized drive assembly accelerates the wheelchair.

5. The steering system of claim 4, wherein the steering device includes a second user actuatable member operably connected to a brake assembly associated with the front wheel, wherein in response to actuation of the second user actuatable member the brake assembly applies a braking force to the front wheel.

6. The steering system of claim 1, wherein in response to rotation of the steering device, the front wheel responsively rotates relative to the frame assembly.

7. The steering system of claim 1, further comprising:

a mounting assembly coupled to the frame assembly, the mounting assembly is electrically connected to the steering device, the mounting assembly including a first electrical connector, wherein the connection assembly included a second electrical connector, wherein the mounting assembly is configured to removably fasten to the connection assembly, wherein the motorized drive assembly is configured to electrically connect to the connection assembly, and wherein in response to the mounting assembly removably fastening to the connection assembly, the first electrical connector and the second electrical connector are configured to operably connect to electrically connect the motorized drive assembly to the steering device.

8. The steering system of claim 7, wherein the mounting assembly includes a first portion of a latch assembly, and the connection assembly includes a second portion of the latch assembly, wherein the first portion of the latch assembly is configured to engage the second portion of the latch assembly to removably fasten the mounting assembly to the connection assembly.

9. A method of selectively connecting a steering assembly to a wheelchair comprising:

lifting a first end of a frame assembly, the first end of the frame assembly carrying a mounting assembly, a second end of the frame assembly, opposite the first end, carrying a steering member and a front wheel operably connected to the steering member;

maintaining contact of the front wheel with a surface; and engaging the mounting assembly with a connection assembly coupled to the wheelchair while a motorized drive assembly is coupled to the wheelchair, the motorized drive assembly positioned rearward of an axis of rotation of a pair of rear wheels of the wheelchair, the connection assembly is electrically connected to the motorized drive assembly, the engaging step includes fastening the mounting assembly to the connection assembly, and connecting a first electrical connector of the mounting assembly with a second electrical connector of the connection assembly electrically connecting the steering assembly to the motorized drive assembly.

10. The method of claim 9, wherein coupling the electrical connector to the motorized drive assembly is by a magnetic connection.

11. The method of claim 9, wherein the first electrical connector is electrically connected to a first actuator positioned on the steering member.

12. The method of claim 9, wherein the mounting assembly includes a latch, the engaging step further comprising:

engaging the latch with a member carried by the connection assembly.

13. The method of claim 12, further comprising:

actuating a second actuator operably connected to the latch to disengage the latch from the member; and lowering the first end of the frame assembly.

14. The method of claim 13, wherein the second actuator is a lever.

15. The method of claim 13, wherein the second actuator is positioned on the steering member.

16. The method of claim 13, wherein lowering the first end of the frame assembly disengages the first electrical connector of the mounting assembly from the second electrical connector of the connection assembly.

17. The method of claim 9, wherein the connection assembly is coupled to an axle of the wheelchair.

18. A steering assembly for a wheelchair comprising:

a steering member;

a front wheel operably connected to the steering member;

a frame assembly configured to carry the steering member and the front wheel at a first end of the frame assembly; and a mounting assembly coupled to a second end of the frame assembly, opposite the first end, the mounting assembly configured to selectively couple to a rear axle of the wheelchair and selectively electrically connect to a motorized drive assembly removably coupled to the rear axle of the wheelchair wherein the mounting assembly is configured to electrically connect and selectively couple to a connection assembly fastened to a rear axle of the wheelchair, the connection assembly being electrically connected to the motorized drive assembly, and wherein in response to the mounting assembly electrically connecting to the connection assembly, the steering member is in electronic communication with the motorized drive assembly.

19. The steering assembly of claim 18, the mounting assembly further comprising:

a first connection assembly; and a second connection assembly, wherein the first connection assembly is configured to selectively couple to the rear axle of the wheelchair.

20. The steering assembly of claim 19, wherein the first connection assembly is a latch assembly configured to selectively engage a member coupled to the rear axle of the wheelchair.

21. The steering assembly of claim 20, wherein the steering member includes a first actuator operably connected to the latch assembly, wherein in response to actuation of the first actuator, the latch assembly is configured to disengage with the member coupled to the rear axle of the wheelchair.

22. The steering assembly of claim 19, wherein the second connection assembly is an electrical connector configured to selectively connect to the motorized drive assembly.

23. The steering assembly of claim 22, wherein the electrical connector includes a magnet to selectively connect to the motorized drive assembly.

24. The steering assembly of claim 22, wherein the steering member includes a second actuator operably connected to the electrical connector, wherein in response to actuation of the second actuator while the electrical connector is selectively connected to the motorized drive assembly, the motorized drive assembly accelerates the wheelchair.

25. The steering assembly of claim 18, wherein the frame assembly includes a first end opposite a second end, wherein the mounting assembly is positioned at the first end of the frame assembly, and the steering member and the wheel are carried by the frame assembly at the second end of the frame assembly, the motorized drive assembly being rearward of an axis of rotation of the rear axle.

26. A removable steering system for a wheelchair comprising:

a frame assembly defining a first end opposite a second end;

a wheelchair mounting assembly coupled to the first end of the frame assembly;

a steering assembly including a steering member operably connected to a front wheel, the steering assembly coupled to the second end of the frame assembly; and an actuation member coupled to the steering assembly, the actuation member operably connected to the wheelchair mounting assembly, wherein, while the front wheel remains in contact with a surface, the frame assembly is configured to be moved between a first position, where the wheelchair mounting assembly engages a portion of the wheelchair to attach the steering system to the wheelchair, and a second position, where the wheelchair mounting assembly disengages the portion of the wheelchair to detach the steering system from the wheelchair, wherein a motorized drive assembly is removably mounted to the wheelchair while the frame assembly is moved between the first and second positions, and wherein actuation of the actuation member disengages the frame assembly from the portion of the wheelchair.

27. The removable steering system of claim 26, wherein the portion of the wheelchair is an axle extending between wheels of the wheelchair.

28. The removable steering system of claim 27, wherein the wheels of the wheelchair are rear wheels of a manual wheelchair.

29. The removable steering system of claim 26, wherein the steering member is a handlebar configured to be engaged by a user.

30. The removable steering system of claim 26, wherein the steering member is configured to rotate the front wheel.

31. The removable steering system of claim 26, wherein the surface is a surface upon which the wheelchair is configured to traverse.

32. The removable steering system of claim 26, wherein the motorized drive assembly is coupled to the portion of the wheelchair.

33. The removable steering system of claim 32, wherein in the first position, the frame assembly is in operable communication with the motorized drive assembly, and in the second position, the frame assembly is detached from operable communication with the motorized drive assembly.

34. The removable steering system of claim 33, wherein the wheelchair mounting assembly includes an electrical connector configured to electrically connect to the motorized drive assembly in the first position, and electrically disconnect from the motorized drive assembly in the second position.

35. The removable steering system of claim 34, wherein the electrical connector includes a magnetic connection to facilitate the connection to the motorized drive assembly.

36. The removable steering system of claim 26, wherein the wheelchair mounting assembly includes a latch assembly, wherein in response to actuation of the actuation member, the latch assembly disengages from a member mounted to the portion of the wheelchair.

37. The removable steering system of claim 26, wherein moving the frame assembly between the first position and the second position includes pivoting the first end of the frame assembly relative to the front wheel.

* * * * *